(12) United States Patent
Baratta et al.

(10) Patent No.: US 11,972,231 B2
(45) Date of Patent: Apr. 30, 2024

(54) WEB-BASED POINT OF SALE BUILDER

(71) Applicant: CLOUDOFCHANGE, LLC, Poughkeepsie, NY (US)

(72) Inventors: Wayne Baratta, Poughkeepsie, NY (US); Quentin Olson, Port Townsend, WA (US)

(73) Assignee: CLOUDOFCHANGE, LLC, Poughkeepsie, NY (US)

( * ) Notice: Subject to any disclaimer, the term of this patent is extended or adjusted under 35 U.S.C. 154(b) by 113 days.

(21) Appl. No.: 17/643,124

(22) Filed: Dec. 7, 2021

(65) Prior Publication Data

US 2022/0197602 A1 Jun. 23, 2022

Related U.S. Application Data

(63) Continuation of application No. 15/827,948, filed on Nov. 30, 2017, now Pat. No. 11,226,793, which is a
(Continued)

(51) Int. Cl.
*G06Q 10/00* (2023.01)
*G06F 8/30* (2018.01)
(Continued)

(52) U.S. Cl.
CPC .................. *G06F 8/30* (2013.01); *G06F 8/34* (2013.01); *G06Q 20/20* (2013.01); *G06Q 20/202* (2013.01); *G06Q 30/06* (2013.01); *H04L 67/02* (2013.01)

(58) Field of Classification Search
CPC ...... G06Q 20/20; G06Q 30/06; G06Q 20/202; G06F 8/30
See application file for complete search history.

(56) References Cited

U.S. PATENT DOCUMENTS

| 5,696,909 A | 12/1997 | Wallner |
| 5,818,428 A | 10/1998 | Eisenbrandt et al. |

(Continued)

FOREIGN PATENT DOCUMENTS

| EP | 1450324 A1 | 5/2017 |
| GB | 2369201 | 2/2002 |

(Continued)

OTHER PUBLICATIONS

Certain non-designated documents listed on the face of the Lightspeed OnSite Claim Chart Contentions listed by Bates numbering: LIGHTSPEED043221.
(Continued)

*Primary Examiner* — Rokib Masud
(74) *Attorney, Agent, or Firm* — Knobbe, Martens, Olson & Bear, LLP

(57) ABSTRACT

This invention provides a system and a method for online, web-based point of sale (POS) building and configuration, which can assist non-expert business operators in building, editing and testing a point of sale system to manage their businesses. The business operations range from a single branch to a large chain of stores or branches. The key advantages of the Web-based POS builder are that it is completely built on the foundation of the Web. The POS builder is accessible anywhere in the world. It can be used by a person of any skill level. The POS builder builds, edits, and tests new POS terminals in real time.

31 Claims, 5 Drawing Sheets

Related U.S. Application Data continuation of application No. 15/635,097, filed on Jun. 27, 2017, now Pat. No. 10,083,012, which is a continuation of application No. 15/198,117, filed on Jun. 30, 2016, now Pat. No. 9,715,371, which is a continuation of application No. 12/012,666, filed on Feb. 5, 2008, now Pat. No. 9,400,640.

(51) Int. Cl.
  *G06F 8/34* (2018.01)
  *G06Q 20/20* (2012.01)
  *G06Q 30/06* (2023.01)
  *H04L 67/02* (2022.01)

(56) References Cited

U.S. PATENT DOCUMENTS

| | | |
|---|---|---|
| 5,889,863 A | 3/1999 | Weber |
| 5,897,622 A | 4/1999 | Blinn et al. |
| 5,912,743 A | 6/1999 | Kinebuchi et al. |
| 5,920,312 A | 7/1999 | Wagner |
| 5,937,041 A | 8/1999 | Cardillo, IV et al. |
| 5,956,716 A | 9/1999 | Kenner et al. |
| 5,987,426 A | 11/1999 | Goodwin, III |
| 6,002,395 A | 12/1999 | Wagner et al. |
| 6,058,373 A | 5/2000 | Blinn et al. |
| 6,247,032 B1 | 6/2001 | Bernardo et al. |
| 6,304,886 B1 | 10/2001 | Bernardo et al. |
| 6,384,850 B1* | 5/2002 | McNally ............ G06F 16/9577 715/810 |
| 6,401,074 B1 | 6/2002 | Sleeper |
| 6,629,080 B1 | 9/2003 | Kolis |
| 6,920,431 B2 | 7/2005 | Showghi et al. |
| 6,982,733 B1 | 1/2006 | McNally et al. |
| 6,993,498 B1 | 1/2006 | Deaton et al. |
| 7,015,945 B1 | 3/2006 | Sullivan |
| 7,051,091 B1 | 5/2006 | Cohen et al. |
| 7,086,584 B2 | 8/2006 | Stoutenburg et al. |
| 7,174,312 B2 | 2/2007 | Harper et al. |
| 7,472,394 B1 | 12/2008 | Meckenstock et al. |
| 7,711,100 B2 | 5/2010 | Dennis |
| 7,721,969 B2 | 5/2010 | Johnson et al. |
| 7,810,723 B2 | 10/2010 | Boardman et al. |
| 7,841,514 B2 | 11/2010 | Mueller et al. |
| 7,845,554 B2 | 12/2010 | Jacobs |
| 8,032,414 B2 | 10/2011 | Payne et al. |
| 8,146,077 B2 | 3/2012 | McNally et al. |
| 8,364,845 B2 | 1/2013 | Richter |
| 8,595,061 B2 | 11/2013 | Falk et al. |
| 9,009,060 B2 | 4/2015 | McNally |
| 9,131,012 B2 | 9/2015 | Pi Farias |
| 9,269,082 B2 | 2/2016 | Redmond et al. |
| 9,317,844 B2 | 4/2016 | Richelson et al. |
| 9,400,640 B2 | 7/2016 | Baratta et al. |
| 9,679,320 B2 | 6/2017 | Harper et al. |
| 9,747,651 B2 | 8/2017 | McNally |
| 10,083,012 B2 | 9/2018 | Baratta et al. |
| 10,664,826 B2 | 5/2020 | Hong |
| 2001/0037206 A1 | 11/2001 | Falk et al. |
| 2001/0037245 A1 | 11/2001 | Ranganath et al. |
| 2001/0047302 A1 | 11/2001 | Yoshinaga et al. |
| 2002/0059405 A1 | 5/2002 | Angwin et al. |
| 2002/0082927 A1 | 6/2002 | Borenstein et al. |
| 2002/0095342 A1 | 7/2002 | Feldman et al. |
| 2002/0194074 A1* | 12/2002 | Jacobs .................. G07G 1/145 705/16 |
| 2003/0041330 A1 | 2/2003 | Smith |
| 2003/0078843 A1 | 4/2003 | Sone |
| 2003/0078849 A1 | 4/2003 | Snyder |
| 2003/0120546 A1 | 6/2003 | Cusack et al. |
| 2003/0220841 A1 | 11/2003 | Maritzen |
| 2003/0236755 A1 | 12/2003 | Dagelet |
| 2004/0128199 A1 | 7/2004 | Cusack et al. |
| 2004/0143512 A1 | 7/2004 | Sturr |
| 2004/0181454 A1 | 9/2004 | Manno |
| 2004/0205023 A1 | 10/2004 | Hafer et al. |
| 2005/0021409 A1 | 1/2005 | Michaud et al. |
| 2005/0049921 A1* | 3/2005 | Tengler .................. G07G 1/14 705/26.1 |
| 2005/0182680 A1 | 8/2005 | Jones |
| 2006/0026502 A1 | 2/2006 | Dutta |
| 2006/0085265 A1 | 4/2006 | Dietz et al. |
| 2006/0111983 A1 | 5/2006 | Malison |
| 2006/0195510 A1 | 8/2006 | McNally |
| 2006/0235755 A1* | 10/2006 | Mueller .................. G09F 9/35 705/15 |
| 2007/0005685 A1 | 1/2007 | Chau et al. |
| 2007/0038727 A1 | 2/2007 | Bailey et al. |
| 2007/0175992 A1 | 8/2007 | Brown |
| 2007/0265935 A1* | 11/2007 | Woycik .................. G07F 5/18 705/26.5 |
| 2007/0276763 A1 | 11/2007 | Kleinman et al. |
| 2008/0077872 A1 | 3/2008 | Zeevi et al. |
| 2008/0208696 A1 | 8/2008 | Olson |
| 2008/0208698 A1 | 8/2008 | Olson et al. |
| 2009/0182630 A1 | 7/2009 | Otto et al. |
| 2011/0218872 A1 | 9/2011 | Richelson et al. |
| 2013/0110656 A1 | 5/2013 | Chau et al. |
| 2016/0253645 A1 | 9/2016 | Ciabarra et al. |
| 2017/0300301 A1 | 10/2017 | Baratta et al. |

FOREIGN PATENT DOCUMENTS

| | | |
|---|---|---|
| GB | 2369201 A | 5/2002 |
| JP | 2004164194 A | 6/2004 |
| JP | 2004234394 A | 8/2004 |
| JP | 2004310679 A | 11/2004 |
| JP | 2009075745 A | 4/2009 |
| KR | 20030088637 A | 11/2003 |
| WO | WO2001018629 | 3/2001 |
| WO | WO2001065427 | 9/2001 |
| WO | 2002039226 A2 | 5/2002 |
| WO | WO2003065178 | 8/2003 |
| WO | 2005115074 A2 | 12/2005 |
| WO | WO2005115074 | 12/2005 |
| WO | 2007117578 A2 | 10/2007 |

OTHER PUBLICATIONS

Certain non-designated documents listed on the face of the Lightspeed OnSite Claim Chart Contentions listed by Bates numbering: LIGHTSPEED043223.

Certain non-designated documents listed on the face of the Lightspeed OnSite Claim Chart Contentions listed by Bates numbering: LIGHTSPEED043225.

Certain non-designated documents listed on the face of the Lightspeed OnSite Claim Chart Contentions listed by Bates numbering: LIGHTSPEED043227.

Certain non-designated documents listed on the face of the Lightspeed OnSite Claim Chart Contentions listed by Bates numbering: LIGHTSPEED043229.

Certain non-designated documents listed on the face of the Lightspeed OnSite Claim Chart Contentions listed by Bates numbering: LIGHTSPEED043231.

Certain non-designated documents listed on the face of the Lightspeed OnSite Claim Chart Contentions listed by Bates numbering: LIGHTSPEED043233.

Certain non-designated documents listed on the face of the Lightspeed OnSite Claim Chart Contentions listed by Bates numbering: LIGHTSPEED043235.

Certain non-designated documents listed on the face of the Lightspeed OnSite Claim Chart Contentions listed by Bates numbering: LIGHTSPEED043237.

Certain non-designated documents listed on the face of the Lightspeed OnSite Claim Chart Contentions listed by Bates numbering: LIGHTSPEED043239.

Certain non-designated documents listed on the face of the Lightspeed OnSite Claim Chart Contentions listed by Bates numbering: LIGHTSPEED043241.

(56) References Cited

OTHER PUBLICATIONS

Certain non-designated documents listed on the face of the Lightspeed OnSite Claim Chart Contentions listed by Bates numbering: LIGHTSPEED043243.
Certain non-designated documents listed on the face of the Lightspeed OnSite Claim Chart Contentions listed by Bates numbering: LIGHTSPEED043245.
Certain non-designated documents listed on the face of the Lightspeed OnSite Claim Chart Contentions listed by Bates numbering: LIGHTSPEED043247.
Certain non-designated documents listed on the face of the Lightspeed OnSite Claim Chart Contentions listed by Bates numbering: LIGHTSPEED043249.
Certain non-designated documents listed on the face of the Lightspeed OnSite Claim Chart Contentions listed by Bates numbering: LIGHTSPEED043251.
Certain non-designated documents listed on the face of the Lightspeed OnSite Claim Chart Contentions listed by Bates numbering: LIGHTSPEED043253.
Certain non-designated documents listed on the face of the Lightspeed OnSite Claim Chart Contentions listed by Bates numbering: LIGHTSPEED043255.
Certain non-designated documents listed on the face of the Lightspeed OnSite Claim Chart Contentions listed by Bates numbering: LIGHTSPEED043257.
Certain non-designated documents listed on the face of the Lightspeed OnSite Claim Chart Contentions listed by Bates numbering: LIGHTSPEED043259.
Certain non-designated documents listed on the face of the Lightspeed OnSite Claim Chart Contentions listed by Bates numbering: LIGHTSPEED043261.
Certain non-designated documents listed on the face of the Lightspeed OnSite Claim Chart Contentions listed by Bates numbering: LIGHTSPEED043263.
Certain non-designated documents listed on the face of the Lightspeed OnSite Claim Chart Contentions listed by Bates numbering: LIGHTSPEED043265.
Certain non-designated documents listed on the face of the Lightspeed OnSite Claim Chart Contentions listed by Bates numbering: LIGHTSPEED043267.
Certain non-designated documents listed on the face of the Lightspeed OnSite Claim Chart Contentions listed by Bates numbering: LIGHTSPEED043279.
Certain non-designated documents listed on the face of the Lightspeed OnSite Claim Chart Contentions listed by Bates numbering: LIGHTSPEED043283.
Certain non-designated documents listed on the face of the Lightspeed OnSite Claim Chart Contentions listed by Bates numbering: LIGHTSPEED043286.
Certain non-designated documents listed on the face of the Lightspeed OnSite Claim Chart Contentions listed by Bates numbering: LIGHTSPEED043287.
Certain non-designated documents listed on the face of the Lightspeed OnSite Claim Chart Contentions listed by Bates numbering: LIGHTSPEED043292.
Certain non-designated documents listed on the face of the Lightspeed OnSite Claim Chart Contentions listed by Bates numbering: LIGHTSPEED043294.
Certain non-designated documents listed on the face of the Lightspeed OnSite Claim Chart Contentions listed by Bates numbering: LIGHTSPEED043312.
Certain non-designated documents listed on the face of the Lightspeed OnSite Claim Chart Contentions listed by Bates numbering: LIGHTSPEED043510.
Certain non-designated documents listed on the face of the Lightspeed OnSite Claim Chart Contentions listed by Bates numbering: LIGHTSPEED043519.
Certain non-designated documents listed on the face of the Lightspeed OnSite Claim Chart Contentions listed by Bates numbering: LIGHTSPEED043520.
Certain non-designated documents listed on the face of the Lightspeed OnSite Claim Chart Contentions listed by Bates numbering: LIGHTSPEED043521.
Certain non-designated documents listed on the face of the Lightspeed OnSite Claim Chart Contentions listed by Bates numbering: LIGHTSPEED043522.
Certain non-designated documents listed on the face of the Lightspeed OnSite Claim Chart Contentions listed by Bates numbering: LIGHTSPEED043523.
Certain non-designated documents listed on the face of the Lightspeed OnSite Claim Chart Contentions listed by Bates numbering: LIGHTSPEED043524.
Certain non-designated documents listed on the face of the Lightspeed OnSite Claim Chart Contentions listed by Bates numbering: LIGHTSPEED043525.
Certain non-designated documents listed on the face of the Lightspeed OnSite Claim Chart Contentions listed by Bates numbering: LIGHTSPEED043526.
Certain non-designated documents listed on the face of the Lightspeed OnSite Claim Chart Contentions listed by Bates numbering: LIGHTSPEED043527.
Certain non-designated documents listed on the face of the Lightspeed OnSite Claim Chart Contentions listed by Bates numbering: LIGHTSPEED043528.
Certain non-designated documents listed on the face of the Lightspeed OnSite Claim Chart Contentions listed by Bates numbering: LIGHTSPEED043529.
Certain non-designated documents listed on the face of the Lightspeed OnSite Claim Chart Contentions listed by Bates numbering: LIGHTSPEED043530.
Certain non-designated documents listed on the face of the Lightspeed OnSite Claim Chart Contentions listed by Bates numbering: LIGHTSPEED055126.
Certain non-designated documents listed on the face of the Lightspeed OnSite Claim Chart Contentions listed by Bates numbering: LIGHTSPEED055145.
Certain non-designated documents listed on the face of the Lightspeed OnSite Claim Chart Contentions listed by Bates numbering: LIGHTSPEED056404.
Certain non-designated documents listed on the face of the Lightspeed OnSite Claim Chart Contentions listed by Bates numbering: LIGHTSPEED056406.
Certain non-designated documents listed on the face of the Lightspeed OnSite Claim Chart Contentions listed by Bates numbering: LIGHTSPEED056408.
Certain non-designated documents listed on the face of the Lightspeed OnSite Claim Chart Contentions listed by Bates numbering: LIGHTSPEED056410.
W1—IBM makes Linux retail-ready (IBM Corporation, 2005).
W2—QSRs feel economic pinch (NetWorld Alliance, 2008) available at http://www.qsrweb.com/article.php?id=9822.
W3—Nextep Systems, What We Do (Nextep Systems, 2005) available at https://web.archive.org/web/20051023002618/https://www.nextepsystems.com/ [LIGHTSPEED071849].
W4—Nextep Systems, Home (Nextep Systems, 2005) available at https://web.archive.org/web/20060202134005/http://nextepsystems.com:80/ [LIGHTSPEED071850].
W5—Nextep Systems, Restaurants (Nextep Systems, 2005) available at https://web.archive.org/web/20060202134005/http://nextepsystems.com:80/ [LIGHTSPEED071851].
W6—Nextep Systems, Touchscreen Ordering (Nextep Systems, 2005) available at https://web.archive.org/web/20060202134005/http://nextepsystems.com:80/ [LIGHTSPEED071852].
W7—Nextep Systems, Online Ordering (Nextep Systems, 2005) available at https://web.archive.org/web/20060202134005/http://nextepsystems.com:80/ [LIGHTSPEED071853].
W8—Nextep Systems, Digital Signage (Nextep Systems, 2005) available at https://web.archive.org/web/20060202134005/http://nextepsystems.com:80/ [LIGHTSPEED071854].
W9—Nextep Systems, News (Nextep Systems, 2006) available at https://web.archive.org/web/20060202134005/http://nextepsystems.com:80/ [LIGHTSPEED071855].

(56) References Cited

OTHER PUBLICATIONS

W10—Nextep Systems, Casinos (Nextep Systems, 2005) available at https://web.archive.org/web/20061205191019/http://www.nextepsystems.com/ [LIGHTSPEED071856].
W11—Nextep Systems, News (Nextep Systems, 2006) available at https://web.archive.org/web/20070105023541/http://www.nextepsystems.com:80/ [LIGHTSPEED071857].
W12—Exit41, Company (Exit41) available at https://web.archive.org/web/20070104031531/http://www.exit41.com/company.html [LIGHTSPEED071881].
W13—Exit41, Solutions (Exit41) available at https://web.archive.org/web/20070105093413/http://exit41.com/solutions.html [LIGHTSPEED071884].
W14—Exit41, Solutions (Exit41) available at https://web.archive.org/web/20070105093413/http://exit41.com/solutions.html [LIGHTSPEED071885].
W15—Exit41, Solutions (Exit41) available at https://web.archive.org/web/20070105093413/http://exit41.com/solutions.html [LIGHTSPEED071886].
W16—Exit41, Solutions (Exit41) available at https://web.archive.org/web/20070105093413/http://exit41.com/solutions.html [LIGHTSPEED071887].
W17—Exit41, Management Team (Exit41) available at https://web.archive.org/web/20070104031531/http://www.exit41.com/company.html [LIGHTSPEED071888].
W18—Exit41, Board Members (Exit41) available at https://web.archive.org/web/20070104031531/http://www.exit41.com/company.html [LIGHTSPEED071891].
W19—Exit41, Partners (Exit41) available at https://web.archive.org/web/20070104031531/http://www.exit41.com/company.html [LIGHTSPEED071894].
W20—Exit41, Press (Exit41) available at https://web.archive.org/web/20070104031531/http://www.exit41.com/company.html [LIGHTSPEED071897].
W21—Exit41, Contact US (Exit41) available at https://web.archive.org/web/20070104031531/http://www.exit41.com/company.html [LIGHTSPEED071900].
Certain non-designated documents listed on the face of the Lightspeed OnSite Claim Chart Contentions listed by Bates numbering: LIGHTSPEED056663.
Certain non-designated documents listed on the face of the Lightspeed OnSite Claim Chart Contentions listed by Bates numbering: LIGHTSPEED056665.
Certain non-designated documents listed on the face of the Lightspeed OnSite Claim Chart Contentions listed by Bates numbering: LIGHTSPEED056667.
Certain non-designated documents listed on the face of the Lightspeed OnSite Claim Chart Contentions listed by Bates numbering: LIGHTSPEED056669.
Certain non-designated documents listed on the face of the Lightspeed OnSite Claim Chart Contentions listed by Bates numbering: LIGHTSPEED056671.
Certain non-designated documents listed on the face of the Lightspeed OnSite Claim Chart Contentions listed by Bates numbering: LIGHTSPEED056674.
Certain non-designated documents listed on the face of the Lightspeed OnSite Claim Chart Contentions listed by Bates numbering: LIGHTSPEED056676.
Certain non-designated documents listed on the face of the Lightspeed OnSite Claim Chart Contentions listed by Bates numbering: LIGHTSPEED056678.
Certain non-designated documents listed on the face of the Lightspeed OnSite Claim Chart Contentions listed by Bates numbering: LIGHTSPEED056680.
Certain non-designated documents listed on the face of the Lightspeed OnSite Claim Chart Contentions listed by Bates numbering: LIGHTSPEED056683.
Certain non-designated documents listed on the face of the Lightspeed OnSite Claim Chart Contentions listed by Bates numbering: LIGHTSPEED056689.
Certain non-designated documents listed on the face of the Lightspeed OnSite Claim Chart Contentions listed by Bates numbering: LIGHTSPEED056692.
Certain non-designated documents listed on the face of the Lightspeed OnSite Claim Chart Contentions listed by Bates numbering: LIGHTSPEED056695.
Certain non-designated documents listed on the face of the Lightspeed OnSite Claim Chart Contentions listed by Bates numbering: LIGHTSPEED056697.
Certain non-designated documents listed on the face of the Lightspeed OnSite Claim Chart Contentions listed by Bates numbering: LIGHTSPEED056699.
Certain non-designated documents listed on the face of the Lightspeed OnSite Claim Chart Contentions listed by Bates numbering: LIGHTSPEED056703.
Certain non-designated documents listed on the face of the Lightspeed OnSite Claim Chart Contentions listed by Bates numbering: LIGHTSPEED056705.
Certain non-designated documents listed on the face of the Lightspeed OnSite Claim Chart Contentions listed by Bates numbering: LIGHTSPEED056707.
Certain non-designated documents listed on the face of the Lightspeed OnSite Claim Chart Contentions listed by Bates numbering: LIGHTSPEED056713.
Certain non-designated documents listed on the face of the Lightspeed OnSite Claim Chart Contentions listed by Bates numbering: LIGHTSPEED056715.
Certain non-designated documents listed on the face of the Lightspeed OnSite Claim Chart Contentions listed by Bates numbering: LIGHTSPEED056717.
Certain non-designated documents listed on the face of the Lightspeed OnSite Claim Chart Contentions listed by Bates numbering: LIGHTSPEED056720.
Certain non-designated documents listed on the face of the Lightspeed OnSite Claim Chart Contentions listed by Bates numbering: LIGHTSPEED056722.
Certain non-designated documents listed on the face of the Lightspeed OnSite Claim Chart Contentions listed by Bates numbering: LIGHTSPEED056724.
Certain non-designated documents listed on the face of the Lightspeed OnSite Claim Chart Contentions listed by Bates numbering: LIGHTSPEED056726.
Certain non-designated documents listed on the face of the Lightspeed OnSite Claim Chart Contentions listed by Bates numbering: LIGHTSPEED056728.
Certain non-designated documents listed on the face of the Lightspeed OnSite Claim Chart Contentions listed by Bates numbering: LIGHTSPEED056730.
Certain non-designated documents listed on the face of the Lightspeed OnSite Claim Chart Contentions listed by Bates numbering: LIGHTSPEED056733.
Certain non-designated documents listed on the face of the Lightspeed OnSite Claim Chart Contentions listed by Bates numbering: LIGHTSPEED056735.
Certain non-designated documents listed on the face of the Lightspeed OnSite Claim Chart Contentions listed by Bates numbering: LIGHTSPEED056738.
Certain non-designated documents listed on the face of the Lightspeed OnSite Claim Chart Contentions listed by Bates numbering: LIGHTSPEED056740.
Certain non-designated documents listed on the face of the Lightspeed OnSite Claim Chart Contentions listed by Bates numbering: LIGHTSPEED056742.
Certain non-designated documents listed on the face of the Lightspeed OnSite Claim Chart Contentions listed by Bates numbering: LIGHTSPEED056745.
Certain non-designated documents listed on the face of the Lightspeed OnSite Claim Chart Contentions listed by Bates numbering: LIGHTSPEED056747.
Certain non-designated documents listed on the face of the Lightspeed OnSite Claim Chart Contentions listed by Bates numbering: LIGHTSPEED056751.

(56) References Cited

OTHER PUBLICATIONS

Certain non-designated documents listed on the face of the Lightspeed OnSite Claim Chart Contentions listed by Bates numbering: LIGHTSPEED056753.
Certain non-designated documents listed on the face of the Lightspeed OnSite Claim Chart Contentions listed by Bates numbering: LIGHTSPEED056755.
Certain non-designated documents listed on the face of the Lightspeed OnSite Claim Chart Contentions listed by Bates numbering: LIGHTSPEED056757.
Certain non-designated documents listed on the face of the Lightspeed OnSite Claim Chart Contentions listed by Bates numbering: LIGHTSPEED056759.
Certain non-designated documents listed on the face of the Lightspeed OnSite Claim Chart Contentions listed by Bates numbering: LIGHTSPEED056762.
Certain non-designated documents listed on the face of the Lightspeed OnSite Claim Chart Contentions listed by Bates numbering: LIGHTSPEED056764.
Certain non-designated documents listed on the face of the Lightspeed OnSite Claim Chart Contentions listed by Bates numbering: LIGHTSPEED056767.
Certain non-designated documents listed on the face of the Lightspeed OnSite Claim Chart Contentions listed by Bates numbering: LIGHTSPEED056770.
Certain non-designated documents listed on the face of the Lightspeed OnSite Claim Chart Contentions listed by Bates numbering: LIGHTSPEED056772.
Certain non-designated documents listed on the face of the Lightspeed OnSite Claim Chart Contentions listed by Bates numbering: LIGHTSPEED056774.
Certain non-designated documents listed on the face of the Lightspeed OnSite Claim Chart Contentions listed by Bates numbering: LIGHTSPEED056776.
Certain non-designated documents listed on the face of the Lightspeed OnSite Claim Chart Contentions listed by Bates numbering: LIGHTSPEED056778.
Certain non-designated documents listed on the face of the Lightspeed OnSite Claim Chart Contentions listed by Bates numbering: LIGHTSPEED056780.
Certain non-designated documents listed on the face of the Lightspeed OnSite Claim Chart Contentions listed by Bates numbering: LIGHTSPEED056783.
Certain non-designated documents listed on the face of the Lightspeed OnSite Claim Chart Contentions listed by Bates numbering: LIGHTSPEED056785.
Micros, Simphony, Mobi Munch Selects MICROS Simphony for its Integrated 'Food Truck Technology Suite,' ("Food Truck") [CLOVER 003258].
Simphony, https://web.archive.org/web/20081014070030/http://www.micros.com/Products/Simphony/ (Oct. 14, 2008) [CLOVER 003251].
Exhibit A-'640-21—Preliminary Contentions—'640 Patent Invalidity Chart—Squirrel Systems.
Exhibit B-'012-21—Preliminary Contentions—'012 Patent Invalidity Chart—Squirrel Systems.
Exhibit C-'793-21—Preliminary Contentions—'793 Patent Invalidity Chart—Squirrel Systems.
Exhibit B-'012-21—First Supplemental Contentions—1012 Patent Invalidity Chart—Squirrel Systems.
Squirrelsystems: SquirrelOne Solutions, https://web.archive.org/web/20051201101248/http://www.squirrelsystems.com:80/solutions/index.html (Dec. 1, 2005) ("SquirrelOne") [CLOVER 003267].
Squirrelsystems: Corporate POS, https://web.archive.org/web/20060327174026/http://www.squirrelsystems.com/solutions/corppos.html (May 27, 2006) ("Corporate POS") [CLOVER 003262].
Squirrelsystems: Point of Sale, https://web.archive.org/web/20060101034917/http://www.squirrelsystems.com:80/solutions/pos.html (Jan. 1, 2006) ("Point of Sale") [CLOVER 003264].
NetPOS LLC—Internet Web Based Point of Sale Solutions for Hospitality—Home.pdf [LIGHTSPEED075280].
NetPOS.com_Products.pdf [LIGHTSPEED075281].
NetPOS.com Inc_Products_Feature Highlights.pdf [LIGHTSPEED075282].
NetPOS.com_Press_Big Boy International Selects NetPOS.pdf [LIGHTSPEED075283].
NetPOS.com_Press_PC Complete Announces Alliance.pdf [LIGHTSPEED075284].
NetPOS.com_Press_NetPOS Exports to QuickBooks.pdf [LIGHTSPEED075285].
NetPOS.com_Press_NetPOS Forms Strategic Partner Alliance.pdf [LIGHTSPEED075286].
NetPOS.com_Press_Rosies is Surfing the Net.pdf [LIGHTSPEED075288].
NetPOS.com_Press_PC Complete to Provide NetPOS-based Enterprise-wide Solutions.pdf [LIGHTSPEED075289].
NetPOS.com_Press_Web Extends Reach Into Cash Register.pdf [LIGHTSPEED075292].
NetPOS.com_Press_Net based sales terminals replace restaurant registers.pdf [LIGHTSPEED075294].
NetPOS.com_Press_Cash registers on Internet.pdf [LIGHTSPEED075296].
NetPOS.com_Press_Firm uses Web-based technology.pdf [LIGHTSPEED075297].
NetPOS.com_Press_Goodbye Cash Register Hello Web Browser.pdf [LIGHTSPEED075300].
NetPOS.com Inc_Products_System Highlights.pdf [LIGHTSPEED075303].
NetPOS.com Inc_What We Do.pdf [LIGHTSPEED075304].
NetPOS.com Inc_Products_Standard Features.pdf [LIGHTSPEED075305].
NetPOS.com Inc_Products_Enhanced Features.pdf [LIGHTSPEED075306].
NetPOS Product Overview, (2003) [NB0001].
NetPOS Central copy.pdf [NB0009].
TheNetPOSAdvantage copy.pdf [NB0031].
NetPOS Manager Manual v2 copy.pdf [NB0040].
NetPOS Server Manual v9 copy.pdf, [NB0075].
Big Boy Restaurants Proposal, (2001) [NB0131].
Internet Point of Sale System, Excel file, (created Oct. 21, 1997; modified Feb. 28, 2001) (native and pdf version) [NB0138].
Chieh-Chou Chou, Morder-Server Food Service, Cal. State U.; Mar. 2024; Bates No. CLOVER 003273.
Sam Chung, et al., Service-Oriented Software Reengineering: SoSR, Proceedings of the 40th Annual Hawaii International Conference on System Sciences; 2007; Bates No. CLOVER 003396.
Crystal Point Restaurant Technology Unleashed, https://web.archive.org/web/20071223084216/http://crystalpointpos.com:80/; Dec. 23, 2007; Bates No. CLOVER 003406.
Diamondtouch, https://web.archive.org/web/20070113195521/http://www.diamondtouchpos.com/; Bates No. CLOVER 003408.
John Jesitus, Wireless Technology Keeps Customers in Order, Hospitality Technology; Jan. 1997; Bates No. CLOVER 003409.
T. Ojala, SmartRotuaari—Context-aware; Mobile Multimedia Services; 2003; Bates No. CLOVER 003492.
Livepos, https://web.archive.org/web/20081011090143/http://www.livepos.com; Oct. 11, 2008; Bates No. CLOVER 003536.
LivePOS Cloud Point of Sale Solutions—About LivePOS, https://web.archive.org/web/20120222113856/http://www.livepos.com:80/2012/links/aboutus.aspx; Bates No. CLOVER 003533.
LivePOS Cloud Point of Sale Solutions—Features, https://web.archive.org/web/20120222231941/http://www.livepos.com:80/2012/Links/features.aspx; Bates No. CLOVER 003534.
Norshahril Bin Abu Talib, Executive Restaurant Order System, University College of Engineering and Technology; Nov. 2005; Bates No. CLOVER 003632.
P.L. Venetianer, et al., Video Verification; of Point of Sale Transactions, ObjectVideo, Inc.; 2007; Bates No. CLOVER 004654.
Norbert Weibenberg, et al., Using Ontologies in Personalized Mobile Applications, GIS'04 (Nov. 12-13, 2004) Bates No. CLOVER 004660.
Joyce A. Young, The Web as an Ecommerce; Medium, Indiana State University; Dec. 2006; http://dx.doi.org/10.1300/J049v14n01_02; Bates No. CLOVER 004719.

(56) References Cited

OTHER PUBLICATIONS

Certain non-designated documents listed on the face of the Lightspeed OnSite Claim Chart Contentions listed by Bates numbering: LIGHTSPEED056973.
Certain non-designated documents listed on the face of the Lightspeed OnSite Claim Chart Contentions listed by Bates numbering: LIGHTSPEED056975.
Certain non-designated documents listed on the face of the Lightspeed OnSite Claim Chart Contentions listed by Bates numbering: LIGHTSPEED056978.
Certain non-designated documents listed on the face of the Lightspeed OnSite Claim Chart Contentions listed by Bates numbering: LIGHTSPEED056982.
Certain non-designated documents listed on the face of the Lightspeed OnSite Claim Chart Contentions listed by Bates numbering: LIGHTSPEED056986.
Certain non-designated documents listed on the face of the Lightspeed OnSite Claim Chart Contentions listed by Bates numbering: LIGHTSPEED056989.
Certain non-designated documents listed on the face of the Lightspeed OnSite Claim Chart Contentions listed by Bates numbering: LIGHTSPEED056999.
Certain non-designated documents listed on the face of the Lightspeed OnSite Claim Chart Contentions listed by Bates numbering: LIGHTSPEED057017.
Certain non-designated documents listed on the face of the Lightspeed OnSite Claim Chart Contentions listed by Bates numbering: LIGHTSPEED057019.
Certain non-designated documents listed on the face of the Lightspeed OnSite Claim Chart Contentions listed by Bates numbering: LIGHTSPEED057021.
Certain non-designated documents listed on the face of the Lightspeed OnSite Claim Chart Contentions listed by Bates numbering: LIGHTSPEED057023.
Certain non-designated documents listed on the face of the Lightspeed OnSite Claim Chart Contentions listed by Bates numbering: LIGHTSPEED057025.
Certain non-designated documents listed on the face of the Lightspeed OnSite Claim Chart Contentions listed by Bates numbering: LIGHTSPEED057027.
Certain non-designated documents listed on the face of the Lightspeed OnSite Claim Chart Contentions listed by Bates numbering: LIGHTSPEED057030.
Certain non-designated documents listed on the face of the Lightspeed OnSite Claim Chart Contentions listed by Bates numbering: LIGHTSPEED057033.
Certain non-designated documents listed on the face of the Lightspeed OnSite Claim Chart Contentions listed by Bates numbering: LIGHTSPEED057037.
Certain non-designated documents listed on the face of the Lightspeed OnSite Claim Chart Contentions listed by Bates numbering: LIGHTSPEED057041.
Certain non-designated documents listed on the face of the Lightspeed OnSite Claim Chart Contentions listed by Bates numbering: LIGHTSPEED057050.
Certain non-designated documents listed on the face of the Lightspeed OnSite Claim Chart Contentions listed by Bates numbering: LIGHTSPEED057053.
Certain non-designated documents listed on the face of the Lightspeed OnSite Claim Chart Contentions listed by Bates numbering: LIGHTSPEED057055.
Certain non-designated documents listed on the face of the Lightspeed OnSite Claim Chart Contentions listed by Bates numbering: LIGHTSPEED057058.
Certain non-designated documents listed on the face of the Lightspeed OnSite Claim Chart Contentions listed by Bates numbering: LIGHTSPEED057060.
Certain non-designated documents listed on the face of the Lightspeed OnSite Claim Chart Contentions listed by Bates numbering: LIGHTSPEED057062.
Certain non-designated documents listed on the face of the Lightspeed OnSite Claim Chart Contentions listed by Bates numbering: LIGHTSPEED057064.
Certain non-designated documents listed on the face of the Lightspeed OnSite Claim Chart Contentions listed by Bates numbering: LIGHTSPEED057067.
Certain non-designated documents listed on the face of the Lightspeed OnSite Claim Chart Contentions listed by Bates numbering: LIGHTSPEED057070.
Certain non-designated documents listed on the face of the Lightspeed OnSite Claim Chart Contentions listed by Bates numbering: LIGHTSPEED057081.
Certain non-designated documents listed on the face of the Lightspeed OnSite Claim Chart Contentions listed by Bates numbering: LIGHTSPEED057099.
Certain non-designated documents listed on the face of the Lightspeed OnSite Claim Chart Contentions listed by Bates numbering: LIGHTSPEED057101.
Certain non-designated documents listed on the face of the Lightspeed OnSite Claim Chart Contentions listed by Bates numbering: LIGHTSPEED057103.
Certain non-designated documents listed on the face of the Lightspeed OnSite Claim Chart Contentions listed by Bates numbering: LIGHTSPEED057105.
Certain non-designated documents listed on the face of the Lightspeed OnSite Claim Chart Contentions listed by Bates numbering: LIGHTSPEED057109.
Certain non-designated documents listed on the face of the Lightspeed OnSite Claim Chart Contentions listed by Bates numbering: LIGHTSPEED057111.
Certain non-designated documents listed on the face of the Lightspeed OnSite Claim Chart Contentions listed by Bates numbering: LIGHTSPEED057114.
Certain non-designated documents listed on the face of the Lightspeed OnSite Claim Chart Contentions listed by Bates numbering: LIGHTSPEED057116.
Certain non-designated documents listed on the face of the Lightspeed OnSite Claim Chart Contentions listed by Bates numbering: LIGHTSPEED057125.
Certain non-designated documents listed on the face of the Lightspeed OnSite Claim Chart Contentions listed by Bates numbering: LIGHTSPEED057143 (Slipsheet).
Certain non-designated documents listed on the face of the Lightspeed OnSite Claim Chart Contentions listed by Bates numbering: LIGHTSPEED057144.
Certain non-designated documents listed on the face of the Lightspeed OnSite Claim Chart Contentions listed by Bates numbering: LIGHTSPEED057169.
Certain non-designated documents listed on the face of the Lightspeed OnSite Claim Chart Contentions listed by Bates numbering: LIGHTSPEED057747.
Certain non-designated documents listed on the face of the Lightspeed OnSite Claim Chart Contentions listed by Bates numbering: LIGHTSPEED057143.
Certain non-designated videos listed on the face of the Lightspeed OnSite Claim Chart Contentions listed by Bates numbering: LIGHTSPEED043519.
Certain non-designated videos listed on the face of the Lightspeed OnSite Claim Chart Contentions listed by Bates humbering: LIGHTSPEED043520.
Certain non-designated videos listed on the face of the Lightspeed OnSite Claim Chart Contentions listed by Bates numbering: LIGHTSPEED043521.
Certain non-designated videos listed on the face of the Lightspeed OnSite Claim Chart Contentions listed by Bates numbering: LIGHTSPEED043522.
Certain non-designated videos listed on the face of the Lightspeed OnSite Claim Chart Contentions listed by Bates humbering: LIGHTSPEED043523.
Certain non-designated videos listed on the face of the Lightspeed OnSite Claim Chart Contentions listed by Bates humbering: LIGHTSPEED043529.

(56) References Cited

OTHER PUBLICATIONS

Certain non-designated videos listed on the face of the Lightspeed OnSite Claim Chart Contentions listed by Bates humbering: LIGHTSPEED043530.
Certain non-designated videos listed on the face of the Lightspeed OnSite Claim Chart Contentions listed by Bates numbering: LIGHTSPEED043524.
Certain non-designated videos listed on the face of the Lightspeed OnSite Claim Chart Contentions listed by Bates numbering: LIGHTSPEED043525.
Certain non-designated documents listed on the face of the Lightspeed OnSite Claim Chart Contentions listed by Bates numbering: LIGHTSPEED056412.
Certain non-designated documents listed on the face of the Lightspeed OnSite Claim Chart Contentions listed by Bates numbering: LIGHTSPEED056414.
Certain non-designated documents listed on the face of the Lightspeed OnSite Claim Chart Contentions listed by Bates numbering: LIGHTSPEED056416.
Certain non-designated documents listed on the face of the Lightspeed OnSite Claim Chart Contentions listed by Bates numbering: LIGHTSPEED056418.
Certain non-designated documents listed on the face of the Lightspeed OnSite Claim Chart Contentions listed by Bates numbering: LIGHTSPEED056420.
Certain non-designated documents listed on the face of the Lightspeed OnSite Claim Chart Contentions listed by Bates numbering: LIGHTSPEED056424.
Certain non-designated documents listed on the face of the Lightspeed OnSite Claim Chart Contentions listed by Bates numbering: LIGHTSPEED056426.
Certain non-designated documents listed on the face of the Lightspeed OnSite Claim Chart Contentions listed by Bates numbering: LIGHTSPEED056429.
Certain non-designated documents listed on the face of the Lightspeed OnSite Claim Chart Contentions listed by Bates numbering: LIGHTSPEED056431.
Certain non-designated documents listed on the face of the Lightspeed OnSite Claim Chart Contentions listed by Bates numbering: LIGHTSPEED056433.
Certain non-designated documents listed on the face of the Lightspeed OnSite Claim Chart Contentions listed by Bates numbering: LIGHTSPEED056435.
Certain non-designated documents listed on the face of the Lightspeed OnSite Claim Chart Contentions listed by Bates numbering: LIGHTSPEED056438.
Certain non-designated documents listed on the face of the Lightspeed OnSite Claim Chart Contentions listed by Bates numbering: LIGHTSPEED056440.
Certain non-designated documents listed on the face of the Lightspeed OnSite Claim Chart Contentions listed by Bates numbering: LIGHTSPEED056443.
Certain non-designated documents listed on the face of the Lightspeed OnSite Claim Chart Contentions listed by Bates numbering: LIGHTSPEED056446.
Certain non-designated documents listed on the face of the Lightspeed OnSite Claim Chart Contentions listed by Bates numbering: LIGHTSPEED056450.
Certain non-designated documents listed on the face of the Lightspeed OnSite Claim Chart Contentions listed by Bates numbering: LIGHTSPEED056452.
Certain non-designated documents listed on the face of the Lightspeed OnSite Claim Chart Contentions listed by Bates numbering: LIGHTSPEED056455.
Certain non-designated documents listed on the face of the Lightspeed OnSite Claim Chart Contentions listed by Bates numbering: LIGHTSPEED056458.
Certain non-designated documents listed on the face of the Lightspeed OnSite Claim Chart Contentions listed by Bates numbering: LIGHTSPEED056461.
Certain non-designated documents listed on the face of the Lightspeed OnSite Claim Chart Contentions listed by Bates numbering: LIGHTSPEED056463.
Certain non-designated documents listed on the face of the Lightspeed OnSite Claim Chart Contentions listed by Bates numbering: LIGHTSPEED056465.
Certain non-designated documents listed on the face of the Lightspeed OnSite Claim Chart Contentions listed by Bates numbering: LIGHTSPEED056467.
Certain non-designated documents listed on the face of the Lightspeed OnSite Claim Chart Contentions listed by Bates numbering: LIGHTSPEED056469.
Certain non-designated documents listed on the face of the Lightspeed OnSite Claim Chart Contentions listed by Bates numbering: LIGHTSPEED056471.
Certain non-designated documents listed on the face of the Lightspeed OnSite Claim Chart Contentions listed by Bates numbering: LIGHTSPEED056473.
Certain non-designated documents listed on the face of the Lightspeed OnSite Claim Chart Contentions listed by Bates numbering: LIGHTSPEED056475.
Certain non-designated documents listed on the face of the Lightspeed OnSite Claim Chart Contentions listed by Bates numbering: LIGHTSPEED056477.
Certain non-designated documents listed on the face of the Lightspeed OnSite Claim Chart Contentions listed by Bates numbering: LIGHTSPEED056479.
Certain non-designated documents listed on the face of the Lightspeed OnSite Claim Chart Contentions listed by Bates numbering: LIGHTSPEED056481.
Certain non-designated documents listed on the face of the Lightspeed OnSite Claim Chart Contentions listed by Bates numbering: LIGHTSPEED056483.
Certain non-designated documents listed on the face of the Lightspeed OnSite Claim Chart Contentions listed by Bates numbering: LIGHTSPEED056485.
Certain non-designated documents listed on the face of the Lightspeed OnSite Claim Chart Contentions listed by Bates numbering: LIGHTSPEED056487.
Certain non-designated documents listed on the face of the Lightspeed OnSite Claim Chart Contentions listed by Bates numbering: LIGHTSPEED056494.
Certain non-designated documents listed on the face of the Lightspeed OnSite Claim Chart Contentions listed by Bates numbering: LIGHTSPEED056496.
Certain non-designated documents listed on the face of the Lightspeed OnSite Claim Chart Contentions listed by Bates numbering: LIGHTSPEED056498.
Certain non-designated documents listed on the face of the Lightspeed OnSite Claim Chart Contentions listed by Bates numbering: LIGHTSPEED056500.
Certain non-designated documents listed on the face of the Lightspeed OnSite Claim Chart Contentions listed by Bates numbering: LIGHTSPEED056502.
Certain non-designated documents listed on the face of the Lightspeed OnSite Claim Chart Contentions listed by Bates numbering: LIGHTSPEED056504.
Certain non-designated documents listed on the face of the Lightspeed OnSite Claim Chart Contentions listed by Bates numbering: LIGHTSPEED056506.
Certain non-designated documents listed on the face of the Lightspeed OnSite Claim Chart Contentions listed by Bates numbering: LIGHTSPEED056508.
Certain non-designated documents listed on the face of the Lightspeed OnSite Claim Chart Contentions listed by Bates numbering: LIGHTSPEED056510.
Certain non-designated documents listed on the face of the Lightspeed OnSite Claim Chart Contentions listed by Bates numbering: LIGHTSPEED056512.
Certain non-designated documents listed on the face of the Lightspeed OnSite Claim Chart Contentions listed by Bates numbering: LIGHTSPEED056514.

(56) References Cited

OTHER PUBLICATIONS

Certain non-designated documents listed on the face of the Lightspeed OnSite Claim Chart Contentions listed by Bates numbering: LIGHTSPEED056516.
Certain non-designated documents listed on the face of the Lightspeed OnSite Claim Chart Contentions listed by Bates numbering: LIGHTSPEED056518.
Certain non-designated documents listed on the face of the Lightspeed OnSite Claim Chart Contentions listed by Bates numbering: LIGHTSPEED056520.
Certain non-designated documents listed on the face of the Lightspeed OnSite Claim Chart Contentions listed by Bates numbering: LIGHTSPEED056522.
Certain non-designated documents listed on the face of the Lightspeed OnSite Claim Chart Contentions listed by Bates numbering: LIGHTSPEED056524.
Certain non-designated documents listed on the face of the Lightspeed OnSite Claim Chart Contentions listed by Bates numbering: LIGHTSPEED056526.
X1—FREEMercator SourceForge & Wayback.pdf, LIGHTSPEED073146-184.
X2—Mercator from Wayback Machine & SourceForge.pdf, LIGHTSPEED072964-145.
V1—Olson, Q. (Nov. 1, 2001). "Brewing Java at the Point of Sale," Software (Linux Journal 2001) available at https://www.linuxjournal.com/article/4848, "Brewing Java".
V2—"Home" page, globalretailtech.com (Global Retail Technology, LLC Mar. 24, 2005) available at https://web.archive.org/web/20050324032219/http:/globalretailtech.com:80/ (last accessed Nov. 8, 2022), "Mercator Home Page."
V3—"JavaPOS," globalretailtech.com (JAVAPOS™ Jun. 12, 2004) linked from Mercator Home page (Global Retail Technology, LLC Mar. 24, 2005) available at https://web.archive.org/web/20050324032219/http:/globalretailtech.com:80/ and https://web.archive.org/web/20050406011730/http://www.javapos.com/ (last accessed Dec. 9, 2022), "JavaPOS."
V4—"License" page, globalretailtech.com (Global Retail Technology, LLC Mar. 24, 2005) available at https://web.archive.org/web/20050324032219/http:/globalretailtech.com:80/ (last accessed Nov. 8, 2022), "Mercator License Page."
V5—"POS" page, globalretailtech.com (Global Retail Technology, LLC Mar. 24, 2005) available at https://web.archive.org/web/20050324032219/http:/globalretailtech.com:80/ (last accessed Nov. 8, 2022), "Mercator POS Page."
V6—"Back Office" page, globalretailtech.com (Global Retail Technology, LLC Mar. 24, 2005) available at https://web.archive.org/web/20050324032219/http:/globalretailtech.com:80/ (last accessed Nov. 8, 2022), "Mercator Back Office Page."
V7—"Downloads" page, globalretailtech.com (Global Retail Technology, LLC Mar. 24, 2005) available at https://web.archive.org/web/20050324032219/http:/globalretailtech.com:80/ (last accessed Nov. 8, 2022), "Mercator Downloads Page."
V8—"Mercator Point of Sale, POS Application Toolkit © 2001-2003", via "Overview" link, Downloads page, globalretailtech.com (Global Retail Technology, LLC Mar. 24, 2005) available at https://web.archive.org/web/20050211111704fw_/http:/globalretailtech.com/download/Overview.pdf (last accessed Nov. 8, 2022), Mercator POS Toolkit.
V9—"Mercator Point of Sale, Mercator Community License (MCL) © 2003," via "License" link, Downloads page, globalretailtech.com (Global Retail Technology, LLC, copyright 2003, Mar. 24, 2005) available at https://web.archive.org/web/20050211111704fw_/http:/globalretailtech.com/download/Overview.pdf (last accessed Nov. 8, 2022), Mercator Community License.
V10—"Mercator POS Features © 2003" via Features link, Mercator Downloads page, globalretailtech.com (Global Retail Technology, LLC Mar. 24, 2005) available at https://web.archive.org/web/20050211111704fw_/http:/globalretailtech.com/download/Mercator-Features.pdf (last accessed Nov. 8, 2022), "Mercator Features."
V11—Mercator POS Software Design © 2000-2002 via "Design" link, Downloads page, globalretailtech.com (Global Retail Technology, LLC Mar. 24, 2005) available at https://web.archive.org/web/20050211111704fw_/http:/ globalretailtech.com/download/Mercator-Design.pdf (last accessed Nov. 8, 2022), "Mercator Software Design."
V12—Mercator Point of Sale Why Java? © 2001-2003 via "Design" link, Downloads page, globalretailtech.com (Global Retail Technology, LLC Mar. 24, 2005) available at https://web.archive.org/web/20050211111704fw_/http:/globalretailtech.com/download/Mercator-Design.pdf (last accessed Nov. 8, 2022), "Mercator POS, Why Java?".
V13—Mercator Point of Sale Mercator Community License © 2001-2003 via "Design" link, Downloads page, globalretailtech.com (Global Retail Technology, LLC Mar. 24, 2005) available at https://web.archive.org/web/20050211111704fw_/http:/globalretailtech.com/download/Mercator-Design.pdf (last accessed Nov. 8, 2022), "Mercator POS Community License?".
15—"Global Retail Technology, LLC and Linux Developers Group, Inc. Announce OpenCheckout Joint Venture, Will Develop Open Source Point-Of-Sale (POS) Solutions Based on Java, Linux" (Linux Developers Group, Inc. Oct. 3, 2001) available at https://static.lwn.net/2001/1004/pr/pr3870.php3 (last accessed Nov. 2, 2022) "GRT/Linux Joint Venture".
V16—Home, Public Domain Retail Business Systems Software (Global Retail Technology LLC Feb. 7, 2003) available at Global Retail Technology, LLC (archive.org) https://web.archive.org/web/20030207220927/http://www.globalretailtech.com/index.html (last accessed Nov. 2, 2022), "Mercator Home 2003."
V17—"News" (Global Retail Technology LLC Feb. 7, 2003) available at Global Retail Technology, LLC (archive.org) https://web.archive.org/web/20030207220340/http://www.globalretailtech.com/news.html (last accessed Nov. 2, 2022), "Mercator News 2003."
V18—"POS" (Global Retail Technology LLC Feb. 7, 2003) available at Global Retail Technology, LLC (archive.org) https://web.archive.org/web/20030207222041/http://www.globalretailtech.com/pos.html (last accessed Nov. 2, 2022), "Mercator POS p. 2003."
V19—"BO" (Global Retail Technology LLC Feb. 7, 2003) available at Global Retail Technology, LLC (archive.org) https://web.archive.org/web/20030207220103/http://www.globalretailtech.com/bo.html (last accessed Nov. 2, 2022), "Mercator BO p. 2003."
V20—"Contact" (Global Retail Technology LLC Feb. 7, 2003) available at Global Retail Technology, LLC (archive.org) https://web.archive.org/web/20030207221246/http://www.globalretailtech.com/contact.html (last accessed Nov. 2, 2022).
V23—Document related to Mercator, Browse Files available at http://freemercator.sourceforge.net/.
V24—Document related to Mercator, Browse Files available at https://web.archive.org/web/20030620222647/http://freemercator.sourceforge.net/.
V25—Document related to Mercator, Browse Files available at https://web.archive.org/web/20031119063128/http://freemercator.sourceforge.net:80/.
V26—Document related to Mercator, Browse Files available at https://web.archive.org/web/20031228222015/http://freemercator.sourceforge.net:80/.
V27—Document related to Mercator, Browse Files available at https://web.archive.org/web/20040122123849/http://freemercator.sourceforge.net:80/.
V28—Document related to Mercator, Browse Files available at https://web.archive.org/web/20040510130811/http://freemercator.sourceforge.net:80/.
V29—Document related to Mercator, Browse Files available at https://web.archive.org/web/20040611152023/http://freemercator.sourceforge.net:80/.
V30—Document related to Mercator, Browse Files available at https://web.archive.org/web/20050829173532/http://freemercator.sourceforge.net/.
V31—All codes, jars, and contents of all files and folders on Project Activity, Mercator, Java Point of Sale Activity (Mercator, Olson, Q. 2002). [online] sourceforge.net, linked from "Original GPL", Mercator License page (Global Retail Technology, LLC, Mar. 24, 2005) available https://web.archive.org/web/20050324032219/http:/

(56) References Cited

OTHER PUBLICATIONS globalretailtech.com:80/, also available at https://sourceforge.net/projects/mercator/ https://sourceforge.net/projects/mercator/files/ (last accessed Dec. 9, 2022), collectively "Mercator Old Files."
V32—Mercator, Java Point of Sale Project Activity, (Mercator, Olson, Q. 2002). [online] sourceforge.net, linked from "PostgresSql support" link, Mercator License page (Global Retail Technology, LLC, Mar. 24, 2005) available at https://web.archive.org/web/20050324032219/http:/globalretailtech.com:80/, https://sourceforge.net/projects/mercator/ (last accessed Dec. 9, 2022) "Mercator Summary, SourceForge."
V33—Mercator, Java Point of Sale / News (sourceforge.net) (Mercator, Olson, Q. 2002). [online] sourceforge.net, linked from "PostgresSql support" link, Mercator License page (Global Retail Technology, LLC, Mar. 24, 2005) available at https://web.archive.org/web/20050324032219/http:/globalretailtech.com:80/, ttps://sourceforge.net/p mercator/news/ (last accessed Dec. 9, 2022) "Mercator News, SourceForge."
V34—"JavaPOS Documentation" (JAVAPOS™ Jun. 12, 2004) linked from Mercator Home Page, (Global Retail Technology, LLC Mar. 24, 2005) available at https://web.archive.org/web/20050324032219/http:/globalretailtech.com:80/ (last accessed Dec. 9, 2022).
V35—JavaPOS Deployment Scenarios White Paper, Draft, Version 0.1, Kennis, A. (Star Micronics Feb. 12, 2004), Linked from JavaPos Documentation (JAVAPOS™ Jun. 12, 2004), available at: https://web.archive.org/web/20050324032219/http:/globalretailtech.com:80/, also available at https://web.archive.org/web/20050512142938/http://www.javapos.com:80/downloads/JavaPOS-Deployment_20040212.pdf, (last accessed Dec. 9, 2022—no longer available), "JavaPOS Web Deployment Whitepaper."
V36—"Detailed References, Status file; http://incubator.apache.org/projects/derby.html" (derby, Apache Incubator [online]), Linked from Mercator Downloads Page (Global Retail Technology, LLC Mar. 24, 2005) available at: https:// web.archive.org/web/20050324032219/http:/globalretailtech.com:80/, also available at http://incubator.apache.org/projects/derby.html (last accessed Dec. 9, 2022), "Derby Status File."
V37—Detailed References, "Source Code; SVN;" /repos/asf/incubator/derby/code/trunk/ (derby, Apache Incubator), Linked from Mercator Downloads Page (Global Retail Technology, LLC Mar. 24, 2005) available at: https://web.archive.org/web/20050324032219/http:/globalretailtech.com:80/, also available at http://incubator.apache.org/derby/ (last accessed Dec. 9, 2022), "Derby Source Code".
Certain non-designated documents listed on the face of the posAppliance Claim Chart Contentions Listed by Bates Numbering: LIGHTSPEED072579-LIGHTSPEED072586.
pos-demo.zip file, "Download" Link, POS Page (posAppliance, Global Retail Technology LLC Oct. 18, 2006) available at https://web.archive.org/web/20061109213746/http://www.posappliance.com/downloads/pos-demo.zip (last accessed and downloaded Nov. 2, 2022) ("POS Demo Runtime").
U.S. Pat. No. 10,083,012 patent (190 pages).
Trial Transcript vol. 1, *CloudofChange, LLC* v. *NCR Corporation*, 6-19-cv-00513 (W.D. Tex.) (347 pages).
Plaintiff's Preliminary Infringement Contentions Exhibit A2, *CloudofChange, LLC* v. *Lightspeed POS Inc.*, 6-21-cv-01102 (W.D. Tex.) (40 pages).
Microsoft Computer Dictonary Fifth Edition 2002, pp. 113, 362.
IEEE Standard Dictionary of Electrical and Electronics Terms, Third Edition, an American National Standard Aproved Jul. 20, 1984, p. 570.
Random House Websger's Computer & Internet Dictionary, Third Edition, Philip E. Margolis, Random House New York, p. 374-375.
Microsoft.net, Kick Start, 2004, Hitesh Seth, pp. 17-20.
J2EE Technology in Practice, Building Business Applications with the Java 2 Platform, Enterprise Edition, Rick Cattell, Jim Inscore, Enterprise Partners, Addison-Wesley, p. 25.
Macro media white paper, Macromedia Flash MX-A next generation rich client by Jeremy Allair, Mar. 2002, 14 pages.
USPTO IPR Petition IPR 2022-0097 U.S. Pat. No. 10,083,012 May 5, 2022, (109 pages).
Declaration of Stephen Gray re: Petition for IPR2022-00997 for U.S. Pat. No. 10,083,012 (179 pages).
Apx A01—640 patent—Supplemental Contentions—Invalidity Chart—U.S. Patent Publication 2004/0181454 ("Manno").
Appx A02—640 patent—Supplemental Contentions—Invalidity Chart—U.S. Pat. No. 6,247,032 ("Bernardo").
Appx A03—640 patent—Supplemental Contentions—Brown Invalidity Chart—U.S. Patent Publication No. 2007/0175992 ("Brown").
Appx A04—640 patent—Supplemental Contentions—Invalidity Chart—KR20030088637A ("Choi").
Appx A05—640 patent—Supplemental Contentions—Invalidity Chart—WO 01/65427 ("Costello").
Appx A06—640 patent—Supplemental Contentions—Invalidity Chart—U.S. Patent Publication 2004/0128199 ("Cusak").
Appx A07—640 patent—Supplemental Contentions—Invalidity Chart—U.S. Patent Publication 2005/0021409 ("Michaud").
Appx A08—640 patent—Supplemental Contentions—Invalidity Chart—U.S. Patent Publication 2006/0235755 ("Mueller").
Appx A09—640 patent—Supplemental Contentions—Invalidity Chart—JP 2004-164194A ("Nakamura").
Appx A10—640 patent—Supplemental Contentions—U.S. Patent Publication 2008/0208696 ("Olson").
Appx A11—640 patent—Supplemental Contentions—Invalidity Chart—U.S. Patent Publication WO 03/06517 ("Redmond").
Appx A12—640 patent—Supplemental Contentions—Invalidity Chart—U.S. Patent Publication 2005/0049921 ("Tengler").
Appx A13—640 patent—Supplemental Contentions—Invalidity Chart—WO 02/39226 ("Thompson").
Appx A14—640 patent—Supplemental Contentions—Invalidity Chart—U.S. Patent Publication 2007/0265935 ("Woycik").
Appx A15—640 patent—Supplemental Contentions—Invalidity Chart—Micros Doc Cafe Version 3.0.4 ("Micros").
Appx B01—012 patent—Supplemental Contentions—Invalidity Chart—U.S. Patent Publication 2007/0265935 ("Woycik").
Appx B02—012 patent—Supplemental Contentions—Invalidity Chart—WO 02/39226 ("Thompson").
Appx B03—012 patent—Supplemental Contentions—Invalidity Chart—U.S. Patent Publication 2005/0049921 ("Tengler").
Appx B04—012 patent—Supplemental Contentions—Invalidity Chart—U.S. Patent Publication WO 03/06517 ("Redmond").
Appx B05—012 patent—Supplemental Contentions—Invalidity Chart—U.S. Patent Publication 2008/0208696 ("Olson").
Appx B06—012 patent—Supplemental Contentions—Invalidity Chart—JP 2004-164194A (Nakamura).
Appx B07—012 patent—Supplemental Contentions—Invalidity Chart—Micros Doc Cafe Version 3.0.4 ("Micros").
Appx B08—012 patent—Supplemental Contentions—Invalidity Chart—WO 2007/117578 A2 ("Miller").
Appx B09—012 patent—Supplemental Contentions—Invalidity Chart—U.S. Patent Pub. 2007/0175992 ("Brown").
Appx B10—012 patent—Supplemental Contentions—Invalidity Chart—U.S. Patent App. Pub. 2004/0181454 (Manno).
Appx B11—012 patent—Supplemental Contentions—Invalidity Chart—U.S. Patent App. Pub. 2004/0128199 ("Cusack").
Appx B12—012 patent—Supplemental Contentions—Invalidity Chart—WO 01/65427 ("Costello").
Appx C1—Supplemental Contentions—'793 Patent Invalidity Chart—U.S. Patent Publication 2007/0265935 ("Woycik").
Appx C2—Supplemental Contentions—'793 Patent Invalidity Chart—U.S. Patent Publication 2005/0049921 ("Tengler").
Appx C3—Supplemental Contentions—'793 Patent Invalidity Chart—JP 2004-164194A (Nakamura).
Appx C4—Supplemental Contentions—'793 Patent Invalidity Chart—U.S. Patent Publication US 2006/0195510 ("McNally").
Appx C5—Supplemental Contentions—'793 Patent Invalidity Chart—U.S. Patent Publication 2008/0208696 ("Olson").
Appx C6—Supplemental Contentions—'793 Patent Invalidity Chart—U.S. Patent Publication 2004/0181454 ("Manno").

(56) References Cited

OTHER PUBLICATIONS

Appx C7—Supplemental Contentions—'793 Patent Invalidity Chart—WO 02/39226 ("Thompson").
Appx D—Supplemental Contentions—'640 IPR Petition with Declaration.
Appx E—Supplemental Contentions—'012 IPR Petition with Declaration.
Appx F—Supplemental Contentions—NCR Claim Charts.
M1—"Feature Reference Manual 3700 POS," MICROS® Systems, Inc., © 1998. [LIGHTSPEED008662-LIGHTSPEED009155; filename: fr3700.pdf].
M2—"POS Configurator User's Guide 3700 POS," MICROS® Systems, Inc., © 1998. [LIGHTSPEED013363-LIGHTSPEED013614; filename: Poscfg3700.pdf].
Exhibit A-'640-01—Preliminary Contentions—'640 Patent Invalidity Chart—U.S. Patent App. Pub. No. 2004/0128199 ("Cusack").
Exhibit A-'640-02—Preliminary Contentions—'640 Patent Invalidity Chart—U.S. Patent App. Pub. No. 2004/0181454 ("Manno").
Exhibit A-'640-03—Preliminary Contentions—'640 Patent Invalidity Chart—U.S. Patent App. Pub. No. 2005/0021409 ("Michaud").
Exhibit A-'640-04—Preliminary Contentions—'640 Patent Invalidity Chart—U.S. Patent App. Pub. No. 2005/0049921 ("Tengler").
Exhibit A-'640-05—Preliminary Contentions—'640 Patent Invalidity Chart—U.S. Pat. No. 5,897,622, U.S. Pat. No. 6,058,373, U.S. Pat. No. 6,920,431, U.S. Pub. No. 2005/0182680, U.S. Pub. No. U.S. 2007/0175992, U.S. Pub. No. U.S. 2007/0276763, International Pub. No. WO 01/65427 A1, International Pub. No. WO 02/39226 A2, and International Pub. No. WO 03/065,178 A2, ("Blinn, Blinn II, Showghi, Jones, Brown, Kleinman, Costello, Thompson, and Redmond et al.").
Exhibit A-'640-06—Preliminary Contentions—'640 Patent Invalidity Chart—U.S. Patent App. Pub. No. 2007/0038727 ("Bailey").
Exhibit A-'640-07—Preliminary Contentions—'640 Patent Invalidity Chart—U.S. Patent App. Pub. No. 2007/0265935 ("Woycik").
Exhibit A-'640-08—Preliminary Contentions—'640 Patent Invalidity Chart—U.S. Patent App. Pub. No. 2008/0208696 ("Olson").
Exhibit A-'640-09—Preliminary Contentions—'640 Patent Invalidity Chart—U.S. Pat. No. 6,982,733 ("McNally").
Exhibit A-'640-10—Preliminary Contentions—'640 Patent Invalidity Chart—JP 2004-164194A to Nakamura ("Nakamura").
Exhibit B-'012-01—Preliminary Contentions—'012 Patent Invalidity Chart—U.S. Patent App. Pub. No. 2004/0128199 ("Cusack").
Exhibit B-'012-02—Preliminary Contentions—'012 Patent Invalidity Chart—U.S. Patent App. Pub. No. 2004/0181454 ("Manno").
Exhibit B-'012-03—Preliminary Contentions—'012 Patent Invalidity Chart—U.S. Patent App. Pub. No. 2005/0021409 ("Michaud").
Exhibit B-'012-04—Preliminary Contentions—'012 Patent Invalidity Chart—U.S. Patent App. Pub. No. 2005/0049921 ("Tengler").
Exhibit B-'012-05—Preliminary Contentions—'012 Patent Invalidity Chart—U.S. Pat. No. 5,897,622, U.S. Pat. No. 6,058,373, U.S. Pat. No. 6,920,431, U.S. Pub. No. 2005/0182680, U.S. Pub. No. U.S. 2007/0175992, U.S. Pub. No. U.S. 2007/0276763, International Pub. No. WO 01/65427 A1, International Pub. No. WO 02/39226 A2, and International Pub. No. WO 03/065,178 A2, ("Blinn, Blinn II, Showghi, Jones, Brown, Kleinman, Costello, Thompson, and Redmond et al.").
Exhibit B-'012-06—Preliminary Contentions—'012 Patent Invalidity Chart—U.S. Patent App. Pub. No. 2007/0038727 ("Bailey").
Exhibit B-'012-07—Preliminary Contentions—'012 Patent Invalidity Chart—U.S. Patent App. Pub. No. 2007/0265935 ("Woycik").
Exhibit B-'012-08—Preliminary Contentions—'012 Patent Invalidity Chart—U.S. Patent App. Pub. No. 2008/0208696 ("Olson").
Exhibit B-'012-09—Preliminary Contentions—'012 Patent Invalidity Chart—U.S. Pat. No. 6,982,733 ("McNally").
Exhibit B-'012-10—Preliminary Contentions—'012 Patent Invalidity Chart—JP 2004-164194A to Nakamura ("Nakamura").
Exhibit C-'793-01—Preliminary Contentions—'793 Patent Invalidity Chart—U.S. Patent App. Pub. No. 2004/0128199 ("Cusack").
Exhibit C-'793-02—Preliminary Contentions—'793 Patent Invalidity Chart—U.S. Patent App. Pub. No. 2004/0181454 ("Manno").
Exhibit C-'793-03—Preliminary Contentions—'793 Patent Invalidity Chart—U.S. Patent App. Pub. No. 2005/0021409 ("Michaud").
Exhibit C-'793-04—Preliminary Contentions—'793 Patent Invalidity Chart—U.S. Patent App. Pub. No. 2005/0049921 ("Tengler").
Exhibit C-'793-05—Preliminary Contentions—'793 Patent Invalidity Chart—U.S. Pat. No. 5,897,622 , U.S. Pat. No. 6,058,373, U.S. Pat. No. 6,920,431, U.S. Pub. No. 2005/0182680, U.S. Pub. No. U.S. 2007/0175992, U.S. Pub. No. U.S. 2007/0276763, International Pub. No. WO 01/65427 A1, International Pub. No. WO 02/39226 A2 and International Pub. No. WO 03/065,178 A2, ("Blinn, Blinn II, Showghi, Jones, Brown, Kleinman, Costello, Thompson, and Redmond et al.").
Exhibit C-'793-06—Preliminary Contentions—'793 Patent Invalidity Chart—U.S. Patent App. Pub. No. 2007/0038727 ("Bailey").
Exhibit C-'793-07—Preliminary Contentions—'793 Patent Invalidity Chart—U.S. Patent App. Pub. No. 2007/0265935 ("Woycik").
Exhibit C-'793-08—Preliminary Contentions—'793 Patent Invalidity Chart—U.S. Patent App. Pub. No. 2008/0208696 ("Olson").
Exhibit C-'793-09—Preliminary Contentions—'793 Patent Invalidity Chart—U.S. Pat. No. 6,982,733 ("McNally").
Exhibit C-'793-10—Preliminary Contentions—'793 Patent Invalidity Chart—JP 2004-164194A to Nakamura ("Nakamura").
Exhibit B-'012-01—First Supplemental Contentions—'012 Patent Invalidity Chart—U.S. Patent App. Pub. No. 2004/0128199 ("Cusack").
Exhibit B-'012-02—First Supplemental Contentions—'012 Patent Invalidity Chart—U.S. Patent App. Pub. No. 2004/0181454 ("Manno").
Exhibit B-'012-03—First Supplemental Contentions—'012 Patent Invalidity Chart—U.S. Patent App. Pub. No. 2005/0021409 ("Michaud").
Exhibit B-'012-04—First Supplemental Contentions—'012 Patent Invalidity Chart—U.S. Patent App. Pub. No. 2005/0049921 ("Tengler").
Exhibit B-'012-05—First Supplemental Contentions—'012 Patent Invalidity Chart—U.S. Pat. No. 5,897,622, U.S. Pat. No. 6,058,373, U.S. Pat. No. 6,920,431, U.S. Pub. No. 2005/0182680, U.S. Pub. No. U.S. 2007/0175992, U. S. Pub. No. 2007/0276763, International Pub. No. WO 01/65427 A1, International Pub. No. WO 02/39226 A2, and International Pub. No. WO 03/065,178 A2, ("Blinn, Blinn II, Showghi, Jones, Brown, Kleinman, Costello, Thompson, and Redmond et al.").
Exhibit B-'012-06—First Supplemental Contentions—'012 Patent Invalidity Chart—U.S. Patent App. Pub. No. 2007/0038727 ("Bailey").
Exhibit B-'012-07—First Supplemental Contentions—'012 Patent Invalidity Chart—U.S. Patent App. Pub. No. 2007/0265935 ("Woycik").
Exhibit B-'012-08—First Supplemental Contentions—'012 Patent Invalidity Chart—U.S. Patent App. Pub. No. 2008/0208696 ("Olson").
Exhibit B-'012-09—First Supplemental Contentions—'012 Patent Invalidity Chart—U.S. Pat. No. 6,982,733 ("McNally").
Exhibit B-'012-10—First Supplemental Contentions—'012 Patent Invalidity Chart—JP 2004-164194A to Nakamura ("Nakamura").
Exhibit A-1640-11—Preliminary Contentions—'640 Patent Invalidity Chart—Lukkari, "SmartRestaurant—Mobile Payments in Context-Aware Environment," Proceedings of the 6th International Conference on Electronic Commerce, Mar. 25, 2004, pp. 575-582 ("Lukkari").
Exhibit B-'012-11—Preliminary Contentions—'012 Patent Invalidity Chart—Lukkari, "SmartRestaurant—Mobile Payments in Context-Aware Environment," Proceedings of the 6th International Conference on Electronic Commerce, Mar. 25, 2004, pp. 575-582 ("Lukkari").
Exhibit C-'793-11—reliminary Contentions—'793 Patent Invalidity Chart—Lukkari, "SmartRestaurant—Mobile Payments in Context-Aware Environment," Proceedings of the 6th International Conference on Electronic Commerce, Mar. 25, 2004, pp. 575-582 ("Lukkari").
Exhibit B-'012-11—First Supplemental Contentions—'012 Patent Invalidity Chart—Lukkari, "SmartRestaurant—Mobile Payments in Context-Aware Environment," Proceedings of the 6th International Conference on Electronic Commerce, Mar. 25, 2004, pp. 575-582 ("Lukkari").
Lukkari et al., SmartRestaurant-Mobile Payments in Context-Aware Environment, Proceedings of the 6th International Conference on Electronic Commerce, ICEC 2004, Delft, The Netherlands, Oct. 25-27, 2004, http://dx.doi.org/10.1145/1052220.1052293 (Mar. 25, 2004) ("Lukkari") [CLOVER 000752].

(56) References Cited

OTHER PUBLICATIONS

Exhibit A-'640-12—Preliminary Contentions—1640 Patent Invalidity Chart—21st Century Restaurant.
Exhibit B-'012-12—Preliminary Contentions—'012 Patent Invalidity Chart—21st Century Restaurant.
Exhibit C-'793-12—Preliminary Contentions—'793 Patent Invalidity Chart—21st Century Restaurant.
Exhibit B-'012-12—First Supplemental Contentions—'012 Patent Invalidity Chart—21st Century Restaurant.
Ameranth Wireless™ Announces Award of Patent for its Revolutionary 21st Century Restaurant™ Products (May 16, 2002), https://www.hospitalitynet.org/news/4011916.html ("Hospitality.net") [CLOVER 003269].
Defendant's Invalidity Contentions in Case No. 6:19-CV-00513-ADA, *CloudofChange, LLC*, v. *NCR Corporation*, dated Feb. 24, 2020 in 27 pages.
Exhibit A1: Invalidity of U.S. Pat. No. 9,400,640 based on US2007265935 ("Woycik") in 10 pages.
Exhibit A2: Invalidity of U.S. Pat. No. 10,083,012 based on US2007265935 ("Woycik") in 10 pages.
Exhibit A3: Invalidity of U.S. Pat. No. 9,400,640 based on US20070175992 ("Brown") in 9 pages.
Exhibit A4: Invalidity of U.S. Pat. No. 10,083,012 based on US20070175992 ("Brown") in 11 pages.
Exhibit A5: Invalidity of U.S. Pat. No. 9,400,640 based on US5920312 ("Wagner") in 6 pages.
Exhibit A6: Invalidity of U.S. Pat. No. 10,083,012 based on US5920312 ("Wagner") in 7 pages.
Exhibit A7: Invalidity of U.S. Pat. No. 9,400,640 based on US20020194074 ("Jacobs") in 6 pages.
Exhibit A8: Invalidity of U.S. Pat. No. 10,083,012 based on US20020194074 ("Jacobs") in 6 pages.
Exhibit A9: Invalidity of U.S. Pat. No. 9,400,640 based on US20060235755 ("Mueller") in 8 pages.
Exhibit A10: Invalidity of U.S. Pat. No. 10,083,012 based on US20060235755 ("Mueller") in 8 pages.
Exhibit A11: Invalidity of U.S. Pat. No. 9,400,640 based on US20050049921 ("Tengler") in 9 pages.
Exhibit A12: Invalidity of U.S. Pat. No. 10,083,012 based on US20050049921 ("Tengler") in 9 pages.
Exhibit B1: Invalidity of U.S. Pat. No. 9,400,640 based on US20050021409 ("Michaud") in 6 pages.
Exhibit B2: Invalidity of U.S. Pat. No. 10,083,012 based on US20050021409 ("Michaud") in 6 pages.
Exhibit B3: Invalidity of U.S. Pat. No. 9,400,640 based on US20040143512 ("Sturr") in 6 pages.
Exhibit B4: Invalidity of U.S. Pat. No. 10,083,012 based on US20040143512 ("Sturr") in 6 pages.
Exhibit B5: Invalidity of U.S. Pat. No. 9,400,640 based on EP1450324 ("Yamada") in 6 pages.
Exhibit B6: Invalidity of U.S. Pat. No. 10,083,012 based on EP1450324 ("Yamada") in 7 pages.
Exhibit B7: Invalidity of U.S. Pat. No. 9,400,640 based on U.S. Pat. No. 6,384,850 ("McNally") in 7 pages.
Exhibit B9: Invalidity Claims of U.S. Pat. No. 9,400,640 based on ACS Back Office Options, R6.0 in 9 pages.
Exhibit B9: Invalidity of U.S. Pat. No. 10,083,012 based on U.S. Pat. No. 6,384,850 ("McNally") in 7 pages.
Exhibit B10: Invalidity of U.S. Pat. No. 10,083,012 based on ACS Back Office Options, R6.0 in 10 pages.
Exhibit C1: Invalidity of U.S. Pat. No. 9,400,640 under 35 U.S.C. §112 in 4 pages.
Exhibit C2: Invalidity of U.S. Pat. No. 10,083,012 under 35 U.S.C. §112 in 3 pages.
Exhibit D1: Claims 1-14 of the '640 Patent Are Invalid Under 35 U.S.C. §101 in 2 pages.
Exhibit D2: Claims 1-13 of the '012 Patent Are Invalid Under 35 U.S.C. §101 in 3 pages.
Exhibit A1: Invalidity of U.S. Pat. No. 9,400,640 based on US2007265935 ("Woycik") (First Supplement).
Exhibit A2: Invalidity of U.S. Pat. No. 10,083,012 based on US2007265935 ("Woycik")(First Supplement).
Exhibit A3: Invalidity of U.S. Pat. No. 9,400,640 based on US20070175992 ("Brown") (First Supplement).
Exhibit A3: Invalidity of U.S. Pat. No. 9,400,640 based on US20070175992 ("Brown")(Second Supplement).
Exhibit A4: Invalidity of U.S. Pat. No. 10,083,012 based on US20070175992 ("Brown") (First Supplement).
Exhibit A4: Invalidity of U.S. Pat. No. 10,083,012 based on US20070175992 ("Brown")(Second Supplement).
Exhibit A5: Invalidity of U.S. Pat. No. 9,400,640 based on U.S. Pat. No. 5,920,312 ("Wagner") (First Supplement).
Appendix A6: Invalidity of U.S. Pat. No. 10,083,012 based on U.S. Pat. No. 5,920,312 ("Wagner") (First Supplement).
Exhibit A7: Invalidity of U.S. Pat. No. 9,400,640 based on US20020194074 ("Jacobs")(First Supplement).
Exhibit A8: Invalidity of U.S. Pat. No. 10,083,012 based on US20020194074 ("Jacobs")(First Supplement).
Exhibit A9: Invalidity of U.S. Pat. No. 9,400,640 based on US20060235755 ("Mueller") (First Supplement).
Exhibit A10: Invalidity of U.S. Pat. No. 10,083,012 based on US20060235755 ("Mueller")(First Supplement).
Exhibit A11: Invalidity of U.S. Pat. No. 9,400,640 based on US20050049921 ("Tengler")(First Supplement).
Exhibit A12: Invalidity of U.S. Pat. No. 10,083,012 based on US20050049921 ("Tengler")(First Supplement).
Exhibit A13: Invalidity of U.S. Pat. No. 9,400,640 based on the Cybertill System (First Supplement).
Exhibit A13: Invalidity of U.S. Pat. No. 9,400,640 based on the Cybertill System.
Exhibit A14: Invalidity of U.S. Pat. No. 10,083,012 based on the Cybertill System (First Supplement).
Exhibit A14: Invalidity of U.S. Pat. No. 10,083,012 based on the Cybertill System.
Exhibit B7: Invalidity of U.S. Pat. No. 9,400,640 based on U.S. Pat. No. 6,384,850 ("McNally") (First Supplement).
Exhibit B8: Invalidity of U.S. Pat. No. 10,083,012 based on U.S. Pat. No. 6,384,850 ("McNally")(First Supplement).
DynaKey 5952, DynaKey Real POS 5952 Wedge User's Guide, R1.0, Ncr, 1999.
DynaKey 5953, NCR Real POS™ 5953 USB DynaKey™ User's Guide, Release 2.3, NCR, 2002.
DynaKey 5954. DynaKey Real POS 5954 Next Generation R1.2, Ncr, 2006.
DynaKey 80c, NCR Real POS™ 80c Hardware User's Guide, Release 1.1, NCR, 2002.
ACS Trng 6.0, Advanced Checkout Solution Operator, Training Guide, R6.0, NCR, 2003.
ACS 6.0, Advanced Checkout Solution Back Office Options, R6.0, NCR, 2000.
ACS 6.2, Advanced Checkout Solution Back Office Options, R6.2, NCR, 2008.
ACS Brochure, NCR Advanced Checkout Solution, NCR, 2003.
ACS Buehler, NCR ACS Buehler's Success Story, NCR, 2004.
ACS Heinen, NCR ACS Heinen's Success Story, NCR, 2004.
ACS Lund, NCR ACS Lund's Success Story, NCR, 2005.
*Cloudofchange, LLC* v. *NCR Corporation*, Defendant's First Amended Invalidity Contentions, Aug. 19, 2020.
*Cloudofchange, LLC* v. *NCR Corporation*, Defendant's Final Invalidity Contentions, Aug. 31, 2020.
UPOS, NCR Retail Controls 3.x UPOS Users Guide, Issue H, NCR, 2007.
RSM Win, NCR Retail Platform Software for Windows, Release 4.0, NCR, 2009.
Co-pending U.S. Appl. No. 11/710,722, filed Feb. 26, 2007, "Point of Sale System with Web-Based Back-Office," by Quentin Olson, 25 pgs.
Co-pending U.S. Appl. No. 11/710,723, filed Feb. 26, 2007, "Point of sale Video Server Processing System," by Quentin Olson et al., 24 pgs.
Co-pending U.S. Appl. No. 12/012,393, filed Feb. 1, 2008, "Hand-Held Web Browser Inventory Checking System," by Quentin Olson et al., 24 pgs.

(56) References Cited

OTHER PUBLICATIONS

Localsoft Tech, db2k e-Store Builder 3.00 details, 3 pgs, found Feb. 8, 2008, http://www.soft32donwload.com/software/dbk-e-STore-Builder-download-details.html.
IBM 4690 ASTRA—Graphical User Interface (GUI)—Specifications, 1 pg., found Feb. 8, 2008, http://www.03.ibm.com/products/retail/products/software/gui/astra/specs.html.
MICROS Delivers Harmony to POS Technology with Simphony™. The Industry's First True Enterprise POS Solution, Featuring Service Oriented Architecture, Debuts at FS/TEC, Oct. 10, 2007, 3 pgs.
MICROS Simphony™, http://www.micros.com:80/Products/Simphony/, dated 2006, in 1 page.
MICROS mymicros.net, http://www.micros.com:80/Products/Simphony/, dated 2006, in 1 page.
MICROS Restaurants, http://www.micros.com:80/Products/Simphony/, dated 2006, in 2 pages.
Van der Vlugt, Michel, and Sambasivam, Samuel. "Redesign of Stand-Alone Applications into Thin-Client/Server Architecture". Retrieved from: http://proceedings.informingscience.org/InSITE2005/I57f13Vulg.pdf. (2005).
Certain non-designated videos listed on the face of the Lightspeed OnSite Claim Chart Contentions listed by Bates humbering: LIGHTSPEED043526.
Certain non-designated videos listed on the face of the Lightspeed OnSite Claim Chart Contentions listed by Bates humbering: LIGHTSPEED043527.
Certain non-designated videos listed on the face of the Lightspeed OnSite Claim Chart Contentions listed by Bates numbering: LIGHTSPEED043528.
F1—Flashpoint Operations Guide, Programming Manual (TRIM-P.O.S. Software Corp., 2000), [LIGHTSPEED070611-LIGHTSPEED070809].
F2—Home (www.trimpos.net, 2007) (available at: https://web.archive.org/web/20071031033856/http://www.trimpos.net/sitefiles/index.html) ("Flashpoint Home") [LIGHTSPEED072875-LIGHTSPEED072876].
F3—Products, Point Of Sale (www.trimpos.net, 2007) (available at: https://web.archive.org/web/20071030071603/http://www.trimpos.net/) ("Flashpoint Products") [LIGHTSPEED072953-LIGHTSPEED072959].
F4—Products, Enterprise Solution (www.trimpos.net, 2007) (available at: https://web.archive.org/web/20071030071603/http://www.trimpos.net/) ("Flashpoint Enterprise Solution") [LIGHTSPEED072947-LIGHTSPEED072952].
F5—P.O.S. Includes, Customizable Screens (www.trimpos.net, 2007) (available at: https://web.archive.org/web/20071030071603/http://www.trimpos.net/) ("Flashpoint POS Screens") [LIGHTSPEED072939-LIGHTSPEED072940].
F6—Product Brochures, Enterprise Solutions (www.trimpos.net, 2007) (https://web.archive.org/web/20071031034057/ http://trimpos.net/Enterprise.pdf) (available at: https://easystoremanager.com/trim/flyers/enterprise.pdf) ("Flashpoint Enterprise Brochure") [LIGHTSPEED071468-LIGHTSPEED071469].
F7—Enterprise Includes, Reporting (www.trimpos.net, 2007) (available at: https://web.archive.org/web/20071030071603/http://www.trimpos.net/) ("Flashpoint Enterprise Reporting") [LIGHTSPEED072913-LIGHTSPEED072914].
F8—Products, ADS SQL Data Base Server (www.trimpos.net, 2007) (available at: https://web.archive.org/web/20071030071603/http://www.trimpos.net/) ("Flashpoint SQL Server") [LIGHTSPEED072941-LIGHTSPEED072946].
F9—Product Brochures, The Many Faces of Flashpoint (www.trimpos.net, 2007) (https://web.archive.org/web/20071031034057/http://trimpos.net/faces.pdf) (available at: https://easystoremanager.com/trim/flyers/faces.pdf) ("Flashpoint Screens Brochure") [LIGHTSPEED071470-LIGHTSPEED071471].
F10—Product Brochures, Harman Management Corp uses Flashpoint (www.trimpos.net, 2007) (https://web.archive.org/web/20071031034057/http://trimpos.net/kfc2.pdf) (available at: https://easystoremanager.com/trim/flyers/kfc2.pdf) ("Flashpoint KFC Use") [LIGHTSPEED071834-LIGHTSPEED071835].
F11—P.O.S. Configurations, Quick Food Service (www.trimpos.net, 2007) (available at: https://web.archive.org/web/20071030071603/http://www.trimpos.net/) ("Flashpoint Quick Service") [LIGHTSPEED072895-LIGHTSPEED072900].
F12—P.O.S. Configurations, Retail (www.trimpos.net, 2007) (available at: https://web.archive.org/web/20071030071603/http://www.trimpos.net/) ("Flashpoint Retail") [LIGHTSPEED072901-LIGHTSPEED072904].
F13—Clientele (www.trimpos.net, 2007) (available at: https://web.archive.org/web/20071030071603/http://www.tirimpos.net/) ("Flashpoint Clientele") [LIGHTSPEED072877-LIGHTSPEED072888].
Z1—Aldelo for Restaurants™ User Manual (Aldelo Systems Inc., 2007) ("Aldelo 2007 User Manual") [LIGHTSPEED071488-LIGHTSPEED071821].
Z2—Aldelo® for Restaurants™ Training Manual (Aldelo Systems Inc., 2007) ("Aldelo 2007 Training Manual") [LIGHTSPEED072312-LIGHTSPEED072565].
Z3—Aldelo for Restaurants™ User Manual (Aldelo Systems Inc., 2006) ("Aldelo 2006 User Manual") [LIGHTSPEED071088-LIGHTSPEED071459].
Z4—NextPOS Users Manual, Software Version 2.8 Users Manual, Rev. 7998 (NextPOS Corporation, 2004) ("NextPOSv2.8 Users Manual") [LIGHTSPEED071903-LIGHTSPEED072311].
Z5—NextPOS Software Manual, Software Version 2.8 User Manual, 5th ed. (NextPOS Corporation, 2002) ("NextPOSv2.8 Software Manual") [LIGHTSPEED070810-LIGHTSPEED071068].
Z6—iEnterprise, Online Enterprise Management (Transactional Web, Inc., 2004) ("iEnterprise Datasheet") [LIGHTSPEED071069-LIGHTSPEED071070].
Z7—NextPOS Corporation and Transactional Web, Inc. Partner to Replace Expensive and Labor Intensive Reporting and Accounting for Restaurants with Affordable Subscription-Priced Web Automation, (www.prweb.com, Nov. 30, 2004) (available at: https://www.prweb.com/releases/2004/11/prweb183924.htm#!) (last accessed Oct. 12, 2022) "(iEnterprise Article") [LIGHTSPEED071864-LIGHTSPEED071866].
Z8—Specifications (www.aldelo.com, 2006) (available at: https://web.archive.org/web/20061017063544/http://www.aldelo.com/Default.aspx?tabid=107) (last accessed Nov. 29, 2022) ("Aldelo Specifications") [LIGHTSPEED072631-LIGHTSPEED072632].
Z9—FAQ (www.aldelo.com, 2006) (available at: https://web.archive.org/web/20061017064101/http://www.aldelo.com/Default.aspx?tabid=108) (last accessed Nov. 29, 2022) ("Aldelo FAQs") [LIGHTSPEED072633-LIGHTSPEED072634].
Z10—Aldelo Systems Inc. is now a Microsoft Gold Certified Partner (www.aldelo.com, 2008) (available at: https://web.archive.org/web/20080211172451/http://www.aldelo.com:80/Home/AldeloEDCPassesMicrosoftPlatformTestforISV/tabid/355/Default.aspx) (last accessed Nov. 29, 2022) ("Microsoft Certified") [LIGHTSPEED072641-LIGHTSPEED072642].
Z11—Products & Services (www.nextpos.com, 2004) (available at: https://web.archive.org/web/20040619200022/http://www.nextpos.com:80/english/products.htm) (last accessed Oct. 12, 2022) ("Products & Services") [LIGHTSPEED071861-LIGHTSPEED071862].
Z12—Screen Gallery (www.aldelo.com, 2007) (available at: https://web.archive.org/web/20070523044201/http://aldelo.com:80/Default.aspx?tabid=335) (last accessed Nov. 29, 2022) ("Screen Gallery") [LIGHTSPEED072620-LIGHTSPEED072621].
Z13—Aldelo Gift Card Server (www.aldelo.com, 2007) (available at: https://web.archive.org/web/20071109235244/http://www.aldelo.com:80/Products/AldeloGiftCardServer/tabid/69/Default.aspx) (last accessed Oct. 27, 2022) ("Aldelo Gift Card Server") [LIGHTSPEED072572-LIGHTSPEED072573].
Z14—NextPOS for Restaurants, New Features (B&C Data Systems) (available at: http://www.bcdata.com/nextpos/newfeatures.htm) (last accessed Oct. 12, 2022) ("New Features") [LIGHTSPEED071867-LIGHTSPEED071870].
Aldelo for Restaurants Introduction (Assured Computing Technologies, 2007) (available at: https://www.youtube.com/watch?v=0yY9N-xDTp0) ("Aldelo Introduction Video").

(56) References Cited

OTHER PUBLICATIONS

ACT-POS & Aldelo—Chapter 2—Starting a New Database (Assured Computing Technologies, 2007) (available at: https://www.youtube.com/watch?v=81HnLiCTm2U) ("Aldelo Database Video").
ACT-POS & Aldelo—Chapter 3—Setting Up Employees (Basic) (Assured Computing Technologies, 2007) (available at: https://www.youtube.com/watch?v=pl8iSgz4shs) ("Aldelo Employees Video").
ACT-POS & Aldelo—Chapter 4—Menu Categories (Assured Computing Technologies, 2007) (available at: https://www.youtube.com/watch?v=PuSQbJGx2Fo) ("Aldelo Menu Categories Video").
ACT-POS & Aldelo—Chapter 5—Menu Groups (Assured Computing Technologies, 2008) (available at: https://www.youtube.com/watch?v=yIR1gsq95tA) ("Aldelo Menu Groups Video").
ACT-POS & Aldelo—Chapter 6—Menu Items (Assured Computing Technologies, 2008) (available at: https://www.youtube.com/watch?v=B7N0s-MNEQw) ("Aldelo Menu Items Video").
ACT-POS & Aldleo—Chapter 7—Menu Modifiers (Assured Computing Technologies, 2008) (available at: https://www.youtube.com/watch?v=mQ8t32Ws62U) ("Aldelo Menu Modifiers Video").
ACT-POS & Aldelo—Chapter 8—Basic Cashier Functions (Assured Computing Technologies, 2008) (available at: https://www.youtube.com/watch?v=1JPR57swH_U) ("Aldelo Cashier Video").
ACT-POS & Aldelo for Restaurants Report Overview Chapt. 9 (Assured Computing Technologies, 2008) (available at: https://www.youtube.com/watch?v=V4705GzhxKo) ("Aldelo Reports Video").
ACT-POS & Aldelo—Chapt. 10 Station Settings Part 1 (Assured Computing Technologies, 2008) (available at: https://www.youtube.com/watch?v=T1ProtE38Gg) ("Aldelo Station Settings Video").
ACT-POS & Aldelo—Chapter 1—Introduction/Opening the Program (Assured Computing Technologies, 2007) (available at: https://www.youtube.com/watch?v=EfFz5snk8F8) ("Aldelo Opening Video").
Ameranth Wireless, Aloha Technologies, and Index Hospitality Systems Introduce the 21st Century Restaurant Software to the European POS Market (Jan. 22, 2001), https://www.hospitalitynet.org/news/4006928.html ("Hospitality.net(2)").
The 21st Century Restaurant System by Ameranth is Now Available for Ibertech Aloha POS Customers; Ameranth and Ibertech, Inc. Sign Distribution and License Agreement (Nov. 7, 2000), https://www.hospitalitynet.org/news/4006387.html ("Hospitality.net(3)") [CLOVER 000789].
Our Products (Dec. 10, 2007), https://web.archive.org/web/20071210185311/http://www.ameranth.com/products.htm ("Our Products") [CLOVER 000777].
Kiosk Technology Will Give Vending New Capabilities (Dec. 7, 2007), https://www.vendingmarketwatch.com/home/article/10272967/kiosk-technology-will-give-vending-new-capabilities, at 8 ("Vending Marketwatch") [CLOVER 000761].
Case Study: Croce's Sings the Praises of Ameranth's Restaurant Reservations System (Mar. 15, 2006), ("Case Study") [CLOVER 000780].
21st Century Restaurant, Increase Efficiency with Wireless Ordering, 2001 ("Increase Efficiency") [CLOVER 000778].
Exhibit A-'640-13—Preliminary Contentions—'640 Patent Invalidity Chart—Flashpoint.
Exhibit B-'012-13—Preliminary Contentions—'012 Patent Invalidity Chart—Flashpoint.
Exhibit C-'793-13—Preliminary Contentions—'793 Patent Invalidity Chart—Flashpoint.
Exhibit B-'012-13—First Supplemental Contentions—1012 Patent Invalidity Chart—Flashpoint.
Home Page; https://web.archive.org/web/20071031033856/http://www.trimpos.net/sitefiles/index.html (Oct. 31, 2007) ("Home") [CLOVER 000885].
Products→ Point of Sale, https://web.archive.org/web/20071031033856/http://www.trimpos.net/sitefiles/index.html (Oct. 31, 2007) ("Point of Sale") [CLOVER 004755].
P.O.S. Configuration→ Quick Food Service, https://web.archive.org/web/20071031033856/http://www.trimpos.net/sitefiles/index.html (Oct. 31, 2007) ("Quick Food Service") [CLOVER 004762].

P.O.S. Includes→ Customer Loyalty, https://web.archive.org/web/20071031033856/http://www.trimpos.net/sitefiles/index.html (Oct. 31, 2007) ("Customer Loyalty") [CLOVER 004743].
Enterprise Includes→ Gift & Customer Loyalty, https://web.archive.org/web/20071031033856/http://www.trimpos.net/sitefiles/index.html (Oct. 31, 2007) ("Gift & Customer Loyalty") [CLOVER 004744].
Hardware Requirements, https://web.archive.org/web/20071031033856/http://www.trimpos.net/sitefiles/index.html (Oct. 31, 2007) ("Hardware Requirements") [CLOVER 004747].
Flashpoint Operations Guide, Menu Setup Manual, http://www.trimpos.net/Ver16/Docs/Menu%20Setup.pdf (2013) ("Menu Setup") [CLOVER 000793].
Flashpoint Operations Guide, System Setup Manual, http://www.trimpos.net/Ver16/Docs/System%20Setup.pdf (2013) ("System Setup") [CLOVER 000886].
Flashpoint, News, Wayback Machine [CLOVER 000883—CLOVER 000884].
Exhibit A-'640-14—Preliminary Contentions—'640 Patent Invalidity Chart—The Halo Retail POS System ("Halo").
Exhibit B-'012-14—Preliminary Contentions—'012 Patent Invalidity Chart—The Halo Retail POS System ("Halo").
Exhibit C-'793-14—Preliminary Contentions—'793 Patent Invalidity Chart—The Halo Retail POS System ("Halo").
Exhibit B-'012-14—First Supplemental Contentions—'012 Patent Invalidity Chart—The Halo Retail POS System ("Halo").
Juice It Up! Moves to Web-based POS, Nation's Restaurant News (Jun. 26, 2008), https://www.nrn.com/archive/juice-it-moves-web-based-pos ("Juice") [CLOVER 001026].
Ahmed H. Medina, An Analysis of Market Development Strategy of a Point-of-Sale Solutions Provider's Market Research Database (Summer 2007) (M.B.A. thesis, Simon Fraser University) ("Halo") [CLOVER 001032].
Halo for Restaurants, HALO (Nov. 20, 2006), https://web.archive.org/web/20061120125846/http://www.myhalo.com/section.asp?catid=267 ("Halo For Restaurants") [CLOVER 001028].
Halo for Restaurants, HALO (Aug. 8, 2008), https://web.archive.org/web/20080808085051/http://myhalo.com/ ("Halo for Restaurants II") [CLOVER 001130].
Restaurant POS Systems—Halo, HALO, https://web.archive.org/web/20080612142133/http://www.myhalo.com/restaurant/restaurant_POS/ ("Restaurant POS Systems") [CLOVER 001128].
Vivonet Completes Major Agreement with Sodexo, T-NET (Jul. 19, 2010), https://www.bctechnology.com/news/2010/7/19/Vivonet-Completes-Major-Agreement-with-Sodexo.cfm?id=29403 ("Sodexo") [CLOVER 001139].
Vivonet Introduces Halo Retail POS, T-Net (Apr. 19, 2007), https://www.bctechnology.com/news/2007/4/19/Vivonet-Introduces-Halo-Retail-POS.cfm ("Vivonet Introduces") [CLOVER 001142].
Look to the Light: Retail POS System Can Replace ECR, the Green Sheet Online Edition, Issue 7:6:1 (Jun. 7, 2007), www.greensheet.com/emagazine.php?article_id=136 ("Green Sheet") [CLOVER 001135].
FAQS, HALO, https://web.archive.org/web/20061120125911/http://www.myhalo.com/section.asp?catid=274 ("Leaders") [CLOVER 001030].
Low Cost Point of Sale (POS): Price Your Restaurant POS System, HALO, https://web.archive.org/web/20080804002851/http://www.myhalo.com/restaurant/Price_your_POS/ ("Low Cost Point of Sale") [CLOVER 001126].
Security—What you need to Know, HALO, https://login.vivonet.com/messages/pabp_info.pdf ("Security") [CLOVER 001132].
Exhibit A-'640-15—Preliminary Contentions—1640 Patent Invalidity Chart—NextPos.
Exhibit B-'012-15—Preliminary Contentions—'012 Patent Invalidity Chart—NextPos.
Exhibit C-'793-15—Preliminary Contentions—'793 Patent Invalidity Chart—NextPos.
Exhibit B-'012-15—First Supplemental Contentions—'012 Patent Invalidity Chart—NextPos.
NTPOS, Looking for a complete restaurant point of sale solution? https://web.archive.org/web/20060114023119/http://www.ntpos.com:80/ (Jan. 14, 2006) ("NTPOS") [CLOVER 001732].

(56) References Cited

OTHER PUBLICATIONS

Nextpos, Product Overview, https://web.archive.org/web/20030228034043/http://bcdata.com:80/nextpos/ (Feb. 28, 2003) ("Product Overview") [CLOVER 001992].
PRweb, NextPOS Corporation and Transactional Web, Inc. Partner to Replace Expensive and Labor Intensive Reporting and Accounting for Restaurants with Affordable Subscription-Priced Web Automation, https://www.prweb.com/releases/2004/11/prweb183924.htm (Nov. 30, 2004) ("PRWeb") [CLOVER 001996].
Aldelo, Aldelo for Restaurants, https://web.archive.org/web/20060521002319/http://www.aldelo.com/ProductsandSolutions/AldeloForRestaurants/tabid/67/Default.aspx (May 21, 2006) ("Aldelo") [CLOVER 002000].
NextPOS, NextPOS Software Manual, https://cdn.barcodesinc.com/resources/np28Manual.pdf (1997-2002) ("Software Manual") [CLOVER 001733].
Aldelo, Aldelo for Restaurants User Manual, http://www.cardtransac.com/downloads/POSManual.pdf (1997-2007) ("User Manual") [CLOVER 001398].
Aldelo, Aldelo for Restaurants Training Manual, https://docplayer.net/133803145-Aldelo-for-restaurants-training-manual.html (1997-2007) ("Training Manual") [CLOVER 001144].
NTPOS, Services, https://web.archive.org/web/20060114023119/http://www.ntpos.com:80/ (Jan. 14, 2006) [CLOVER 001995].
Exhibit A-'640-16—Preliminary Contentions—'640 Patent Invalidity Chart—Phoenix Point of Sale.
Exhibit B-'012-16—Preliminary Contentions—'012 Patent Invalidity Chart—Phoenix Point of Sale.
Exhibit C-'793-16—Preliminary Contentions—'793 Patent Invalidity Chart—Phoenix Point of Sale.
Exhibit B-'012-16—First Supplemental Contentions—1012 Patent Invalidity Chart—Phoenix Point of Sale.
Certain non-designated documents listed on the face of the Lightspeed OnSite Claim Chart Contentions listed by Bates numbering: LIGHTSPEED056528.
Certain non-designated documents listed on the face of the Lightspeed OnSite Claim Chart Contentions listed by Bates numbering: LIGHTSPEED056530.
Certain non-designated documents listed on the face of the Lightspeed OnSite Claim Chart Contentions listed by Bates numbering: LIGHTSPEED056533.
Certain non-designated documents listed on the face of the Lightspeed OnSite Claim Chart Contentions listed by Bates numbering: LIGHTSPEED056536.
Certain non-designated documents listed on the face of the Lightspeed OnSite Claim Chart Contentions listed by Bates numbering: LIGHTSPEED056539.
Certain non-designated documents listed on the face of the Lightspeed OnSite Claim Chart Contentions listed by Bates numbering: LIGHTSPEED056542.
Certain non-designated documents listed on the face of the Lightspeed OnSite Claim Chart Contentions listed by Bates numbering: LIGHTSPEED056544.
Certain non-designated documents listed on the face of the Lightspeed OnSite Claim Chart Contentions listed by Bates numbering: LIGHTSPEED056546.
Certain non-designated documents listed on the face of the Lightspeed OnSite Claim Chart Contentions listed by Bates numbering: LIGHTSPEED056548.
Certain non-designated documents listed on the face of the Lightspeed OnSite Claim Chart Contentions listed by Bates numbering: LIGHTSPEED056550.
Certain non-designated documents listed on the face of the Lightspeed OnSite Claim Chart Contentions listed by Bates numbering: LIGHTSPEED056552.
Certain non-designated documents listed on the face of the Lightspeed OnSite Claim Chart Contentions listed by Bates numbering: LIGHTSPEED056554.
Certain non-designated documents listed on the face of the Lightspeed OnSite Claim Chart Contentions listed by Bates numbering: LIGHTSPEED056556.
Certain non-designated documents listed on the face of the Lightspeed OnSite Claim Chart Contentions listed by Bates numbering: LIGHTSPEED056558.
Certain non-designated documents listed on the face of the Lightspeed OnSite Claim Chart Contentions listed by Bates numbering: LIGHTSPEED056560.
Certain non-designated documents listed on the face of the Lightspeed OnSite Claim Chart Contentions listed by Bates numbering: LIGHTSPEED056562.
Certain non-designated documents listed on the face of the Lightspeed OnSite Claim Chart Contentions listed by Bates numbering: LIGHTSPEED056564.
Certain non-designated documents listed on the face of the Lightspeed OnSite Claim Chart Contentions listed by Bates numbering: LIGHTSPEED056566.
Certain non-designated documents listed on the face of the Lightspeed OnSite Claim Chart Contentions listed by Bates numbering: LIGHTSPEED056568.
Certain non-designated documents listed on the face of the Lightspeed OnSite Claim Chart Contentions listed by Bates numbering: LIGHTSPEED056570.
Certain non-designated documents listed on the face of the Lightspeed OnSite Claim Chart Contentions listed by Bates numbering: LIGHTSPEED056572.
Certain non-designated documents listed on the face of the Lightspeed OnSite Claim Chart Contentions listed by Bates numbering: LIGHTSPEED056574.
Certain non-designated documents listed on the face of the Lightspeed OnSite Claim Chart Contentions listed by Bates numbering: LIGHTSPEED056576.
Certain non-designated documents listed on the face of the Lightspeed OnSite Claim Chart Contentions listed by Bates numbering: LIGHTSPEED056578.
Certain non-designated documents listed on the face of the Lightspeed OnSite Claim Chart Contentions listed by Bates numbering: LIGHTSPEED056580.
Certain non-designated documents listed on the face of the Lightspeed OnSite Claim Chart Contentions listed by Bates numbering: LIGHTSPEED056582.
Certain non-designated documents listed on the face of the Lightspeed OnSite Claim Chart Contentions listed by Bates numbering: LIGHTSPEED056584.
Certain non-designated documents listed on the face of the Lightspeed OnSite Claim Chart Contentions listed by Bates numbering: LIGHTSPEED056586.
Certain non-designated documents listed on the face of the Lightspeed OnSite Claim Chart Contentions listed by Bates numbering: LIGHTSPEED056588.
Certain non-designated documents listed on the face of the Lightspeed OnSite Claim Chart Contentions listed by Bates numbering: LIGHTSPEED056590.
Certain non-designated documents listed on the face of the Lightspeed OnSite Claim Chart Contentions listed by Bates numbering: LIGHTSPEED056594.
Certain non-designated documents listed on the face of the Lightspeed OnSite Claim Chart Contentions listed by Bates numbering: LIGHTSPEED056596.
Certain non-designated documents listed on the face of the Lightspeed OnSite Claim Chart Contentions listed by Bates numbering: LIGHTSPEED056598.
Certain non-designated documents listed on the face of the Lightspeed OnSite Claim Chart Contentions listed by Bates numbering: LIGHTSPEED056600.
Certain non-designated documents listed on the face of the Lightspeed OnSite Claim Chart Contentions listed by Bates numbering: LIGHTSPEED056602.
Certain non-designated documents listed on the face of the Lightspeed OnSite Claim Chart Contentions listed by Bates numbering: LIGHTSPEED056604.

(56) References Cited

OTHER PUBLICATIONS

Certain non-designated documents listed on the face of the Lightspeed OnSite Claim Chart Contentions listed by Bates numbering: LIGHTSPEED056606.
Certain non-designated documents listed on the face of the Lightspeed OnSite Claim Chart Contentions listed by Bates numbering: LIGHTSPEED056630.
Certain non-designated documents listed on the face of the Lightspeed OnSite Claim Chart Contentions listed by Bates numbering: LIGHTSPEED056633.
Certain non-designated documents listed on the face of the Lightspeed OnSite Claim Chart Contentions listed by Bates numbering: LIGHTSPEED056635.
Certain non-designated documents listed on the face of the Lightspeed OnSite Claim Chart Contentions listed by Bates numbering: LIGHTSPEED056637.
Certain non-designated documents listed on the face of the Lightspeed OnSite Claim Chart Contentions listed by Bates numbering: LIGHTSPEED056639.
Certain non-designated documents listed on the face of the Lightspeed OnSite Claim Chart Contentions listed by Bates numbering: LIGHTSPEED056641.
Certain non-designated documents listed on the face of the Lightspeed OnSite Claim Chart Contentions listed by Bates numbering: LIGHTSPEED056644.
Certain non-designated documents listed on the face of the Lightspeed OnSite Claim Chart Contentions listed by Bates numbering: LIGHTSPEED056646.
Certain non-designated documents listed on the face of the Lightspeed OnSite Claim Chart Contentions listed by Bates numbering: LIGHTSPEED056650.
Certain non-designated documents listed on the face of the Lightspeed OnSite Claim Chart Contentions listed by Bates numbering: LIGHTSPEED056655.
Certain non-designated documents listed on the face of the Lightspeed OnSite Claim Chart Contentions listed by Bates numbering: LIGHTSPEED056657.
Certain non-designated documents listed on the face of the Lightspeed OnSite Claim Chart Contentions listed by Bates numbering: LIGHTSPEED056659.
Certain non-designated documents listed on the face of the Lightspeed OnSite Claim Chart Contentions listed by Bates numbering: LIGHTSPEED056661.
Appx A01—Preliminary Contentions—640 Patent Invalidity Chart—U.S. Patent Publication 2004/0181454 ("Manno").
Appx A02—Preliminary Contentions—640 Patent Invalidity Chart—U.S. Pat. No. 6,247,032 ("Bernardo").
Appx A03—Preliminary Contentions—640 Patent Invalidity Chart—U.S. Patent Publication No. 2007/0175992 ("Brown").
Appx A04—Preliminary Contentions—640 Patent Invalidity Chart—KR20030088637A ("Choi").
Appx A05—Preliminary Contentions—640 Patent Invalidity Chart—WO 01/65427 ("Costello").
Appx A06—Preliminary Contentions—640 Patent Invalidity Chart—U.S. Patent Publication 2004/0128199 ("Cusak").
Appx A07—Preliminary Contentions—640 Patent Invalidity Chart—U.S. Patent Publication 2005/0021409 ("Michaud").
Appx A08—Preliminary Contentions—640 Patent Invalidity Chart—U.S. Patent Publication 2006/0235755 ("Mueller").
Appx A09—Preliminary Contentions—640 Patent Invalidity Chart—JP 2004-164194A ("Nakamura").
Appx A10—Preliminary Contentions—640 Patent Invalidity Chart—U.S. Patent Publication 2008/0208696 ("Olson").
Appx A11—Preliminary Contentions—640 Patent Invalidity Chart—U.S. Patent Publication WO 03/06517 ("Redmond").
Appx A12—Preliminary Contentions—640 Patent Invalidity Chart—U.S. Patent Publication 2005/0049921 ("Tengler").
Appx A13—Preliminary Contentions—640 Patent Invalidity Chart—WO 02/39226 ("Thompson").
Appx A14—Preliminary Contentions—640 Patent Invalidity Chart—U.S. Patent Publication 2007/0265935 ("Woycik").
Appx A15—Preliminary Contentions—640 Patent Invalidity Chart—Micros Doc Cafe Version 3.0.4 ("Micros").
Appx B01—Preliminary Contentions—012 Patent Invalidity Chart—U.S. Patent Publication 2007/0265935 ("Woycik").
Appx B02—Preliminary Contentions—012 Patent Invalidity Chart—WO 02/39226 ("Thompson").
Appx B03—Preliminary Contentions—012 Patent Invalidity Chart—U.S. Patent Publication 2005/0049921 "Tengler".
Appx B04—Preliminary Contentions—012 Patent Invalidity Chart—WO 03/06517 ("Redmond").
Appx B05—Preliminary Contentions—012 Patent Invalidity Chart—U.S. Patent Publication 2008/0208696 ("Olson").
Appx B06—Preliminary Contentions—012 Patent Invalidity Chart—JP 2004-164194A ("Nakamura").
Appx B07—Preliminary Contentions—012 Patent Invalidity Chart—Micros Doc Cafe Version 3.0.4 ("Micros").
Appx B08—Preliminary Contentions—012 Patent Invalidity Chart—WO 2007/117578A2 ("Miller").
Appx B09—Preliminary Contentions—012 Patent Invalidity Chart—U.S. Patent Pub. 2007/0175992 ("Brown").
Appx B10—Preliminary Contentions—012 Patent Invalidity Chart—U.S. Patent App Pub. 2004/0181454 ("Manno").
Appx B11—Preliminary Contentions—012 Patent Invalidity Chart—U.S. Patent App Pub. 2004/0128199 ("Cusak").
Appx B12—Preliminary Contentions—012 Patent Invalidity Chart—WO 01/65427 ("Costello").
Appx C—Preliminary Contentions—NCR Invalidity Expert Report—Expert Report of Sandeep Chatterjee Ph.D.—Invalidity of Asserted Claims of U.S. Pat. Nos. 9,400,640 and 10,083,012.
Appx A16—Final Contentions—'640 Patent Invalidity Chart—TRIM-POS Flashpoint System ("Flashpoint").
Appx A17—Final Contentions—'640 Patent Invalidity Chart—LightSpeed Onsite System.
Appx A18—Final Contentions—'640 Patent Invalidity Chart—Aldelo/NextPOS System ("Aldelo").
Appx A20—Final Contentions—'640 Patent Invalidity Chart—Mercator POS and Back Office ("Mercator").
Appx A21—Final Contentions—U.S. Pat. No. 9,400,640 B2 ("'640 Patent")—posAppliance.
Appx B13—Final Contentions—'012 Patent Invalidity Chart—TRIM-POS Flashpoint System ("Flashpoint").
Appx B14—Final Contentions—'012 Patent Invalidity Chart—LightSpeed Onsite System.
Appx B15—Final Contentions—'012 Patent Invalidity Chart—Aldelo/NextPOS System ("Aldelo").
Appx B17—Final Contentions—'012 Patent Invalidity Chart—Mercator POS and Back Office ("Mercator").
Appx B18—Final Contentions—Invalidity Chart of U.S. Pat. No. 10,083,012—posAppliance.
Appx C8—Final Contentions—'793 Patent Invalidity Chart—TRIM-POS Flashpoint System ("Flashpoint").
Appx C9—Final Contentions—'793 Patent Invalidity Chart—LightSpeed Onsite System.
Appx C10—Final Contentions—'793 Patent Invalidity Chart—Aldelo/NextPOS System ("Aldelo").
Appx C12—Final Contentions—'793 Patent Invalidity Chart—Mercator POS and Back Office ("Mercator").
Appx C13—Final Contentions—Invalidity Chart of U.S. Pat. No. 11,226,793 ("'793 Patent")—posAppliance.
Appx G—Final Contentions—Petition for Inter Partes Review Case No. IPR2022-01143—U.S. Pat. No. 11,226,793.
Firefly Technologies, Management and Back-Office, ("Management") [CLOVER 002002].
Firefly Technologies, Point of Sale Reinvented, ("Reinvented") [CLOVER 002004].
Firefly, Extreme Pizza Integrates Phoenix POS and Brygid Online Ordering to Automate 1,200-1,800 Web Orders Monthly Per Store, https://web.archive.org/web/20070827075430/http://www.fireflypos.com/about/news_080307.html ("Extreme Pizza") (Aug. 27, 2007) [CLOVER 002006].

(56) References Cited

OTHER PUBLICATIONS

FireFly Technologies Introduces Phoenix Point of Sale, https://www.pizzamarketplace.com/news/firefly-technologies-introduces-phoenix-point-of-sale/ (Mar. 13, 2006) ("Introduces") [CLOVER 002008].
https://web.archive.org/web/20070827104027/http://fireflypos.com:80/about/news_061703.html [CLOVER 011058].
POS Software Showcase '07: Leading Point of Service Solutions for the Restaurant Industry, available at: https://hospitalitytech.com/2007-pos-software-showcase (Nov. 1, 2007) ("Software Showcase") [CLOVER 002011].
FireFly Technologies, Manage: Business Information at Your Fingertips-Anytime, Anywhere, https://web.archive.org/web/20070705200350/http://www.fireflypos.com/phoenixpos/manage2.html (Jul. 5, 2007) ("Manage") [CLOVER 002023].
FireFly Technologies, Ordering: Speed, Accuracy, and Control, https://web.archive.org/web/20071119142022/http://www.fireflypos.com/phoenixpos/ordering.html (Nov. 19, 2007) ("Ordering") [CLOVER 002024].
Thinktank, POS System Research, https://thinktank.pmq.com/t/pos-system-research/2461/2 (Sep. 2006) ("ThinkTank") [CLOVER 002025].
Exhibit A-'640-17—Preliminary Contentions—'640 Patent Invalidity Chart—Point of Success.
Exhibit B-'012-17—Preliminary Contentions—'012 Patent Invalidity Chart—Point of Success.
Exhibit C-'793-17—Preliminary Contentions—'793 Patent Invalidity Chart—Point of Success.
Exhibit B-'012-17—First Supplemental Contentions—'012 Patent Invalidity Chart—Point of Success.
Point of Success Premium: The most advanced Point of Success software available!, https://notabletek.com/files/2021/01/POSPBrochure.pdf (Mar. 18, 2005) ("Point of Success Premium") [CLOVER 002053].
Point of Success Employee Scheduling Software, https://www.freerestaurantsoftware.com/scheduler/ (May 7, 2005) ("Employee Scheduling Software") [CLOVER 002049].
Point of Success Time Clock Software for Restaurant Point of Sale, https://www.pointofsuccess.com/time-clock-software-for-restaurants/ (Mar. 14, 2006) ("Time Clock Software") [CLOVER 004767].
Point of Success: Low Cost POS Software for your Restaurant or Bar, https://web.archive.org/web/20060101024912/http://pointofsuccess.com/ (Jan. 1, 2006) ("Low Cost") [CLOVER 002038].
Point of Success: Order Entry and Preparation, https://web.archive.org/web/20051222105812/http://www.pointofsuccess.com/orderentry.htm (Dec. 22, 2005) ("Order Entry") [CLOVER 002041].
Point of Success: Restaurant POS Hardware Secrets Revealed, https://web.archive.org/web/20051222101337/http://www.pointofsuccess.com/systemrequirements.htm (Dec. 22, 2005) ("Hardware Secrets") [CLOVER 002045].
Point of Success: Feature Comparison for Point of Success Standard and Point of Success Premium, https://web.archive.org/web/20060104041129/http://www.pointofsuccess.com/comparison.htm (Jan. 4, 2006) ("Feature Comparison") [CLOVER 002035].
Point of Success: Restaurant Software for POS Systems, https://web.archive.org/wb/200601040444810/http://www.pointofsuccess.com:80/restaurant-pos-software.htm (Jan. 4, 2006) ("Restaurant Software") [CLOVER 002057].
Exhibit A-1640-18—Preliminary Contentions—'640 Patent Invalidity Chart—Restaurant Pro Express.
Exhibit B-'012-18—Preliminary Contentions—'012 Patent Invalidity Chart—Restaurant Pro Express.
Exhibit C-'793-18—Preliminary Contentions—'793 Patent Invalidity Chart—Restaurant Pro Express.
Exhibit B-'012-18—First Supplemental Contentions—'012 Patent Invalidity Chart—Restaurant Pro Express.
POS Software Showcase '07: Leading Point of Service Solutions for the Restaurant Industry, available at: https://hospitalitytech.com/2007-pos-software-showcase (Nov. 1, 2007) ("Software Showcase") [CLOVER 002061].
PCAmerica, Restaurant Software Features, https://web.archive.org/web/20070212004913/http://www.pcamerica.com/pos_products_features_restaurant_features.html (Feb. 12, 2007) ("Restaurant Software Features") [CLOVER 002073].
PCAmerica, Products and Services, https://web.archive.org/web/20070202145412/http://www.pcamerica.com/restaurant_POS_screen_shots.htm (Feb. 2, 2007) ("Products and Services") [CLOVER 002075].
PCAmerica, Products and Services Restaurant System Recommendations, https://web.archive.org/web/20070202145449/http://www.pcamerica.com/restaurant_pos_systems.html (Feb. 2, 2007) ("Recommendations") [CLOVER 002080].
Exhibit A-'1640-19—Preliminary Contentions—'640 Patent Invalidity Chart—InfoGenesis.
Exhibit B-'012-19—Preliminary Contentions—'012 Patent Invalidity Chart—InfoGenesis.
Exhibit C-'793-19—Preliminary Contentions—'793 Patent Invalidity Chart—InfoGenesis.
Exhibit B-'012-19—First Supplemental Contentions—'012 Patent Invalidity Chart—InfoGenesis.
Hospitality Technology, Point of Service: Now and Later of Restaurant POS, https://hospitalitytech.com/point-service-now-and-later-restaurant-pos (Apr. 9, 2007) ("Now and Later") [CLOVER 002082] (Note: Exhibit A-'640-19—Preliminary Contentions, Exhibit B-'012-19—Preliminary Contentions, Exhibit C-'793-19—Preliminary Contentions, Exhibit B-'012-19—First Supplemental Contentions incorrectly identify this document as CLOVER 002082. It is CLOVER 002338).
Infogenesis, Point-of-Sale, https://web.archive.org/web/20070416203641/http://www.infogenesis.com/restaurants/pointofsalepos.aspx (Mar. 11, 2006) ("Point of Sale") [CLOVER 002341].
Infogenesis, Point-of-Sale, https://web.archive.org/web/20051210182507/http://www.infogenesis.com:80/products/revelation.aspx (Dec. 10, 2005) ("Point of Sale 2") [CLOVER 002343].
Hospitality Technology Pilot Issue, Technology Building Blocks ("Hospitality Pilot") [CLOVER 002082].
Exhibit A-'640-20—Preliminary Contentions—'640 Patent Invalidity Chart—Simphony.
Exhibit B-'012-20—Preliminary Contentions—'012 Patent Invalidity Chart—Simphony.
Exhibit C-'793-20—Preliminary Contentions—'793 Patent Invalidity Chart—Simphony.
Exhibit B-'012-20—First Supplemental Contentions—'012 Patent Invalidity Chart—Simphony.
Micros Simphony TM, https://web.archive.org/web/20071112050945/http://www.micros.com:80/Products/Simphony/ (2006) ("Simphony TM") [CLOVER 003249].
Micros Simphony, https://web.archive.org/web/20060324063129/http://www.micros.com/Products/Simphony/ (2006) ("Simphony") [CLOVER 003250].
Hard Rock International Deploys Centralized Point of Sale with MICROS Simphony(TM), Oracle Hospitality, https://www.hospitalitynet.org/news/4032053.html (Jun. 26, 2007) ("Hard Rock") [CLOVER 003253].
Micros, User's Manual 3700 POS, (1998) ("User's Manual") [CLOVER 002346].
Micros, 8700 HMS Version 2.10 User's Manual ("8700 User's Manual") [CLOVER 002660].
Hotel Online, Micros Delivers Harmony to POS Technology with Simphony™ ("Harmony") [CLOVER 003195].
Custom Software Group ("Custom Software") [CLOVER 003198].
Micros Systems Inc., History, https://web.archive.org/web/20120804012133/http://www.fundinguniverse.com:80/company-histories/micros-systems-inc-history/ ("History") [CLOVER 003199].
UNLV, Premier: The Magazine of the UNLV Harrah Hotel College [CLOVER 003203].
Y1—Welcome to InfoGenesis (www.infogenesis.com, 2001) (available at: https://web.archive.org/web/20010301095226/http://www.infogenesis.com/) ("Welcome to InfoGenesis") [LIGHTSPEED072590].
Y2—About Us (www.infogenesis.com, 2001) (available at: https://web.archive.org/web/20010301095226/http://www.infogenesis.com/) ("About InfoGenesis") [LIGHTSPEED072595].

(56) References Cited

OTHER PUBLICATIONS

Y3—About Us, Industry Partners (www.infogenesis.com, 2001) (available at: https://web.archive.org/web/20010304122214fw_/http://www.infogenesis.com/partners.htm) ("InfoGenesis Industry Partners") [LIGHTSPEED072596].

Y4—Revelation (www.infogenesis.com, 2001) (available at: https://web.archive.org/web/20010215012017fw_/http://www.infogenesis.com/revel.htm) ("InfoGenesis Revelation Pos") [LIGHTSPEED072599].

Y5—Revelation, Touch Screens (www.infogenesis.com, 2001) (available at: https://web.archive.org/web/20010301095226/http://www.infogenesis.com/) ("InfoGenesis Touch Screens") [LIGHTSPEED072963].

Y6—New! ASP (www.infogenesis.com, 2001) (available at: https://web.archive.org/web/20010301095226/http://www.infogenesis.com/) ("InfoGenesis ASP") [LIGHTSPEED072591].

Y7—New! ASP, ASP: The Basics (www.infogenesis.com, 2001) (available at: https://web.archive.org/web/20010301095226/http://www.infogenesis.com/) ("InfoGenesis ASP Basics") [LIGHTSPEED072592].

Y8—New! ASP, e-Revelation (www.infogenesis.com, 2001) (available at: https://web.archive.org/web/20010301182510fw_/http://www.infogenesis.com/asp/asperev.htm) ("InfoGenesis e-Revelation") [LIGHTSPEED072593].

Y9—New! ASP, e-Revelation Brochure (www.infogenesis.com, 2001) (available at: https://web.archive.org/web/20010705185815/http://www.infogenesis.com/images/e-Revelation.pdf) ("InfoGenesis e-Revelation Brochure") [LIGHTSPEED070603].

Y10—New! ASP, FAQs (www.infogenesis.com, 2001) (available at: https://web.archive.org/web/20010302092009fw_/http://www.infogenesis.com/asp/aspfaq.htm) ("InfoGenesis e-Revelation FAQs") [LIGHTSPEED072594].

Y11—In the News, InfoGenesis and Compass Move Forward with ASP POS (www.infogenesis.com, 2001) (available at: https://web.archive.org/web/20010422084858fw_/http://infogenesis.com/compass.htm) ("InfoGenesis Compass Group") [LIGHTSPEED072602].

Y12—In the News, InfoGenesis Launches Chain Restaurant Division (www.infogenesis.com, 2001) (available at: https://web.archive.org/web/20010422151327fw_/http://infogenesis.com/chainres.htm) ("InfoGenesis Chain Restaurants") [LIGHTSPEED072609].

Y13—In the News, InfoGenesis Selected by Microsoft to Provide Technology for Foodservice Operations (www.infogenesis.com, 2001) (available at: https://web.archive.org/web/20010422225003fw_/http://infogenesis.com/micro.htm) ("InfoGenesis Microsoft Foodservice") [LIGHTSPEED072605].

Y14—In the News, InfoGenesis Grows in 2000 (www.infogenesis.com, 2001) (available at: https://web.archive.org/web/20010303013219fw_/http://www.infogenesis.com/growth.htm) ("InfoGenesis Grows") [LIGHTSPEED072608].

Y15—In the News, Space Center Revises POS with Revelation (www.infogenesis.com, 2001) (available at: https://web.archive.org/web/20010306115946fw_/http://www.infogenesis.com/seennm1.htm) ("InfoGenesis Space Center") [LIGHTSPEED072612].

Y16—The Harbor Group Selects ASP POS from InfoGenesis (www.hospitalitynet.org, 2001) (available at: https://www.hospitalitynet.org/news/4008835.html) (last accessed Nov. 15, 2022) ("InfoGenesis Harbor Group") [LIGHTSPEED072587].

Y17—Ideas & Trends, InfoGenesis e-Revelation Case Study Harbor Restaurant Group / Multi Property Restaurant Chain (www.hotel-online.com, 2004) (available at: https://www.hotel-online.com/News/PR2004_1st/Mar04_InfoGenesisHarborRestaurants.html) (last accessed Nov. 15, 2022) ("InfoGenesis Harbor Case Study") [LIGHTSPEED072589].

Y18—Ideas & Trends, InfoGenesis Solution Implemented Case Study—Hyatt Regency Huntington Beach (www.hotel-online.com, 2004) (available at: https://www.hotel-online.com/News/PR2004_4th/Oct04_InfoGenesisHyatt.html) (last accessed Nov. 17, 2022) ("InfoGenesis Hyatt Case Study") [LIGHTSPEED072613].

Y19—The Convergence of Self-service Technology (www.hospitalityupgrade.com 2008) (available at: https://www.hospitalityupgrade.com/Hospitalityupgrade.com-0093-2016Redesign/media/hospitalityupgrade.com-0093/File_Articles/HUSpr08_TheConvergenceofSelfServiceTechnology_Kasavana.pdf) (also available at: https://www.hospitalityupgrade.com/_magazine/magazine_Detail.asp/?ID=278) ("InfoGenesis Self Service") [LIGHTSPEED071484].

Y20—Returning to Server-Centric Hospitality System Applications (Hospitality Review: vol. 19, Iss. 2, Article 7) (2001) (available at: https://digitalcommons.fiu.edu/hospitalityreview/vol/19/iss2/7/) (also available at: https://digitalcommons.fiu.edu/cgi/viewcontent.cgi?article=1351&context=hospitalityreview) ("InfoGenesis Server-Centric System") [LIGHTSPEED071836].

Olson Exhibit 45—"posApplicance Home" available at https://web.archive.org/web/20170923152607/http://posappliance.com/ (last accessed and downloaded Feb. 10, 2023 [LIGHTSPEED075239-LIGHTSPEED075241].

Olson Exhibit 46—"posApplicance (Index.html)" available at https://web.archive.org/web/201 90506142333/http://posappliance.com/.

Olson Exhibit 48—"Global Retail Technology, LLC" available at https://web.archive.org/web/20010405131809/http://www.globalretailtech.com/.

Olson Exhibit 49—"Global Retail Technology—Enterprise Retailers" available at https://web.archive.org/web/20010405130958/http://www.globalretailtech.com/asp.html.

Olson Exhibit 50—"Global Retail Technology—PLU Menu" available at https://web.archive.org/web/20010609111750//http://www.globalretailtech.com/pos3.html [LIGHTSPEED073102].

Olson Exhibit 51—"Global Retail Technology—Item Search" available at https://web.archive.org/web/20050324032219/http://globalretailtech.com:80/.

Olson Exhibit 52—"Mercator POS Features" (Global Retail Technology, LLC, 2003) [LIGHTSPEED072980-LIGHTSPEED072987].

Olson Exhibit 53—"Mercator Back Office" available at https://web.archive.org/web/20050324032219/http://globalretailtech.com:80/.

Olson Exhibit 54—"Mercator Home" available at https://web.archive.org/web/20050324032219/http:/globalretailtech.com:80/ [LIGHTSPEED072964].

Olson Exhibit 55—"Mercator POS Runtime Description" available at https://web.archive.org/web/20050324032219/http:/globalretailtech.com:80/ [LIGHTSPEED072994-LIGHTSPEED073018].

Olson Exhibit 62—"Touchscreens" [LIGHTSPEED009090-LIGHTSPEED009111].

Certain non-designated documents listed on the face of the Lightspeed OnSite Claim Chart Contentions listed by Bates numbering: LIGHTSPEED056798.

Certain non-designated documents listed on the face of the Lightspeed OnSite Claim Chart Contentions listed by Bates numbering: LIGHTSPEED056801.

Certain non-designated documents listed on the face of the Lightspeed OnSite Claim Chart Contentions listed by Bates numbering: LIGHTSPEED056808.

Certain non-designated documents listed on the face of the Lightspeed OnSite Claim Chart Contentions listed by Bates numbering: LIGHTSPEED056811.

Certain non-designated documents listed on the face of the Lightspeed OnSite Claim Chart Contentions listed by Bates numbering: LIGHTSPEED056813.

Certain non-designated documents listed on the face of the Lightspeed OnSite Claim Chart Contentions listed by Bates numbering: LIGHTSPEED056818.

Certain non-designated documents listed on the face of the Lightspeed OnSite Claim Chart Contentions listed by Bates numbering: LIGHTSPEED056820.

Certain non-designated documents listed on the face of the Lightspeed OnSite Claim Chart Contentions listed by Bates numbering: LIGHTSPEED056822.

Certain non-designated documents listed on the face of the Lightspeed OnSite Claim Chart Contentions listed by Bates numbering: LIGHTSPEED056824.

Certain non-designated documents listed on the face of the Lightspeed OnSite Claim Chart Contentions listed by Bates numbering: LIGHTSPEED056826.

(56) References Cited

OTHER PUBLICATIONS

Certain non-designated documents listed on the face of the Lightspeed OnSite Claim Chart Contentions listed by Bates numbering: LIGHTSPEED056829.
Certain non-designated documents listed on the face of the Lightspeed OnSite Claim Chart Contentions listed by Bates numbering: LIGHTSPEED056838.
Certain non-designated documents listed on the face of the Lightspeed OnSite Claim Chart Contentions listed by Bates numbering: LIGHTSPEED056840.
Certain non-designated documents listed on the face of the Lightspeed OnSite Claim Chart Contentions listed by Bates numbering: LIGHTSPEED056843.
Certain non-designated documents listed on the face of the Lightspeed OnSite Claim Chart Contentions listed by Bates numbering: LIGHTSPEED056846.
Certain non-designated documents listed on the face of the Lightspeed OnSite Claim Chart Contentions listed by Bates numbering: LIGHTSPEED056849.
Certain non-designated documents listed on the face of the Lightspeed OnSite Claim Chart Contentions listed by Bates numbering: LIGHTSPEED056851.
Certain non-designated documents listed on the face of the Lightspeed OnSite Claim Chart Contentions listed by Bates numbering: LIGHTSPEED056853.
Certain non-designated documents listed on the face of the Lightspeed OnSite Claim Chart Contentions listed by Bates numbering: LIGHTSPEED056864.
Certain non-designated documents listed on the face of the Lightspeed OnSite Claim Chart Contentions listed by Bates numbering: LIGHTSPEED056866.
Certain non-designated documents listed on the face of the Lightspeed OnSite Claim Chart Contentions listed by Bates numbering: LIGHTSPEED056868.
Certain non-designated documents listed on the face of the Lightspeed OnSite Claim Chart Contentions listed by Bates numbering: LIGHTSPEED056870.
Certain non-designated documents listed on the face of the Lightspeed OnSite Claim Chart Contentions listed by Bates numbering: LIGHTSPEED056872.
Certain non-designated documents listed on the face of the Lightspeed OnSite Claim Chart Contentions listed by Bates numbering: LIGHTSPEED056874.
Certain non-designated documents listed on the face of the Lightspeed OnSite Claim Chart Contentions listed by Bates numbering: LIGHTSPEED056876.
Certain non-designated documents listed on the face of the Lightspeed OnSite Claim Chart Contentions listed by Bates numbering: LIGHTSPEED056886.
Certain non-designated documents listed on the face of the Lightspeed OnSite Claim Chart Contentions listed by Bates numbering: LIGHTSPEED056888.
Certain non-designated documents listed on the face of the Lightspeed OnSite Claim Chart Contentions listed by Bates numbering: LIGHTSPEED056894.
Certain non-designated documents listed on the face of the Lightspeed OnSite Claim Chart Contentions listed by Bates numbering: LIGHTSPEED056896.
Certain non-designated documents listed on the face of the Lightspeed OnSite Claim Chart Contentions listed by Bates numbering: LIGHTSPEED056900.
Certain non-designated documents listed on the face of the Lightspeed OnSite Claim Chart Contentions listed by Bates numbering: LIGHTSPEED056904.
Certain non-designated documents listed on the face of the Lightspeed OnSite Claim Chart Contentions listed by Bates numbering: LIGHTSPEED056908.
Certain non-designated documents listed on the face of the Lightspeed OnSite Claim Chart Contentions listed by Bates numbering: LIGHTSPEED056912.
Certain non-designated documents listed on the face of the Lightspeed OnSite Claim Chart Contentions listed by Bates numbering: LIGHTSPEED056915.
Certain non-designated documents listed on the face of the Lightspeed OnSite Claim Chart Contentions listed by Bates numbering: LIGHTSPEED056917.
Certain non-designated documents listed on the face of the Lightspeed OnSite Claim Chart Contentions listed by Bates numbering: LIGHTSPEED056919.
Certain non-designated documents listed on the face of the Lightspeed OnSite Claim Chart Contentions listed by Bates numbering: LIGHTSPEED056921.
Certain non-designated documents listed on the face of the Lightspeed OnSite Claim Chart Contentions listed by Bates numbering: LIGHTSPEED056924.
Certain non-designated documents listed on the face of the Lightspeed OnSite Claim Chart Contentions listed by Bates numbering: LIGHTSPEED056926.
Certain non-designated documents listed on the face of the Lightspeed OnSite Claim Chart Contentions listed by Bates numbering: LIGHTSPEED056928.
Certain non-designated documents listed on the face of the Lightspeed OnSite Claim Chart Contentions listed by Bates numbering: LIGHTSPEED056930.
Certain non-designated documents listed on the face of the Lightspeed OnSite Claim Chart Contentions listed by Bates numbering: LIGHTSPEED056932.
Certain non-designated documents listed on the face of the Lightspeed OnSite Claim Chart Contentions listed by Bates numbering: LIGHTSPEED056934.
Certain non-designated documents listed on the face of the Lightspeed OnSite Claim Chart Contentions listed by Bates numbering: LIGHTSPEED056952.
Certain non-designated documents listed on the face of the Lightspeed OnSite Claim Chart Contentions listed by Bates numbering: LIGHTSPEED056955.
Certain non-designated documents listed on the face of the Lightspeed OnSite Claim Chart Contentions listed by Bates numbering: LIGHTSPEED056959.
Certain non-designated documents listed on the face of the Lightspeed OnSite Claim Chart Contentions listed by Bates numbering: LIGHTSPEED056963.
Certain non-designated documents listed on the face of the Lightspeed OnSite Claim Chart Contentions listed by Bates numbering: LIGHTSPEED056967.
Certain non-designated documents listed on the face of the Lightspeed OnSite Claim Chart Contentions listed by Bates numbering: LIGHTSPEED056969.
Certain non-designated documents listed on the face of the Lightspeed OnSite Claim Chart Contentions listed by Bates numbering: LIGHTSPEED056971.
V14—"Mercator POS Runtime Description Copyright 2003-2004, Last Update Jan. 7, 2005," via Runtime Description link, Downloads page (Global Retail Technology, LLC Mar. 24, 2005) available at https://web.archive.org/web/20050211111704fw_/http:/globalretailtech.com/runtime.html (last accessed Nov. 8, 2022), and "Mercator POS Runtime Description (ms word)," Downloads page (Global Retail Technology, LLC Mar. 24, 2005) available at https://web.archive.org/web/20050211111704fw_/http://globalretailtech.com/download/runtime.doc (last accessed Nov. 8, 2022), "Mercator POS Runtime."
V21—"Mercator Programming Codes and Contents," Java Point of Sale Files, Mercator Parent folder, (Mercator POS, SourceForge.net Jul. 16, 2002)). [online] sourceforge.net, linked from "PostgresSql support" and Mercator License page (Global Retail Technology, LLC, Mar. 24, 2005) available https://web.archive.org/web/20050324032219/http:/globalretailtech.com:80/ also available at https://sourceforge.net/projects/mercator/files/latest/download (last accessed Dec. 9, 2022—not provided as executable files); at least all codes and contents contained in these files, folder, subfiles and subfolders, collectively, "Mercator, Java Point of Sale download."
V22—Mercator, Java Point of Sale—Browse Files at SourceForge.net All contents of all files and folders on "Files, Project: Mercator,

(56) References Cited

OTHER PUBLICATIONS

Java Point of Sale: Files," (Mercator, Olson, Q. 2002). [online] sourceforge.net, linked from "PostgresSql support" link, Mercator License page (Global Retail Technology, LLC, Mar. 24, 2005) available at https://web.archive.org/web/20050324032219/http://globalretailtech.com:80/, also available at https://sourceforge.net/projects/mercator/files/mercator/ (last accessed Dec. 9, 2022), which refers to all codes, jars, and contents contained in all files, folder, subfiles and subfolders and subfiles, "Mercator Browse Files".

Certain non-designated documents listed on the face of the Lightspeed OnSite Claim Chart Contentions listed by Bates numbering: LIGHTSPEED042812.

Certain non-designated documents listed on the face of the Lightspeed OnSite Claim Chart Contentions listed by Bates numbering: LIGHTSPEED042823.

Certain non-designated documents listed on the face of the Lightspeed OnSite Claim Chart Contentions listed by Bates numbering: LIGHTSPEED042831.

Certain non-designated documents listed on the face of the Lightspeed OnSite Claim Chart Contentions listed by Bates numbering: LIGHTSPEED042841.

Certain non-designated documents listed on the face of the Lightspeed OnSite Claim Chart Contentions listed by Bates numbering: LIGHTSPEED042846.

Certain non-designated documents listed on the face of the Lightspeed OnSite Claim Chart Contentions listed by Bates numbering: LIGHTSPEED042848.

Certain non-designated documents listed on the face of the Lightspeed OnSite Claim Chart Contentions listed by Bates numbering: LIGHTSPEED042856.

Certain non-designated documents listed on the face of the Lightspeed OnSite Claim Chart Contentions listed by Bates numbering: LIGHTSPEED042886.

Certain non-designated documents listed on the face of the Lightspeed OnSite Claim Chart Contentions listed by Bates numbering: LIGHTSPEED042888.

Certain non-designated documents listed on the face of the Lightspeed OnSite Claim Chart Contentions listed by Bates numbering: LIGHTSPEED042894.

Certain non-designated documents listed on the face of the Lightspeed OnSite Claim Chart Contentions listed by Bates numbering: LIGHTSPEED042906.

Certain non-designated documents listed on the face of the Lightspeed OnSite Claim Chart Contentions listed by Bates numbering: LIGHTSPEED042936.

Certain non-designated documents listed on the face of the Lightspeed OnSite Claim Chart Contentions listed by Bates numbering: LIGHTSPEED042938.

Certain non-designated documents listed on the face of the Lightspeed OnSite Claim Chart Contentions listed by Bates numbering: LIGHTSPEED042952.

Certain non-designated documents listed on the face of the Lightspeed OnSite Claim Chart Contentions listed by Bates numbering: LIGHTSPEED042954.

Certain non-designated documents listed on the face of the Lightspeed OnSite Claim Chart Contentions listed by Bates numbering: LIGHTSPEED042955.

Certain non-designated documents listed on the face of the Lightspeed OnSite Claim Chart Contentions listed by Bates numbering: LIGHTSPEED042957.

Certain non-designated documents listed on the face of the Lightspeed OnSite Claim Chart Contentions listed by Bates numbering: LIGHTSPEED042966.

Certain non-designated documents listed on the face of the Lightspeed OnSite Claim Chart Contentions listed by Bates numbering: LIGHTSPEED042977.

Certain non-designated documents listed on the face of the Lightspeed OnSite Claim Chart Contentions listed by Bates numbering: LIGHTSPEED042979.

Certain non-designated documents listed on the face of the Lightspeed OnSite Claim Chart Contentions listed by Bates numbering: LIGHTSPEED042981.

Certain non-designated documents listed on the face of the Lightspeed OnSite Claim Chart Contentions listed by Bates numbering: LIGHTSPEED042983.

Certain non-designated documents listed on the face of the Lightspeed OnSite Claim Chart Contentions listed by Bates numbering: LIGHTSPEED042985.

Certain non-designated documents listed on the face of the Lightspeed OnSite Claim Chart Contentions listed by Bates numbering: LIGHTSPEED043001.

Certain non-designated documents listed on the face of the Lightspeed OnSite Claim Chart Contentions listed by Bates numbering: LIGHTSPEED043024.

Certain non-designated documents listed on the face of the Lightspeed OnSite Claim Chart Contentions listed by Bates numbering: LIGHTSPEED043047.

Certain non-designated documents listed on the face of the Lightspeed OnSite Claim Chart Contentions listed by Bates numbering: LIGHTSPEED043048.

Certain non-designated documents listed on the face of the Lightspeed OnSite Claim Chart Contentions listed by Bates numbering: LIGHTSPEED043051.

Certain non-designated documents listed on the face of the Lightspeed OnSite Claim Chart Contentions listed by Bates numbering: LIGHTSPEED043056.

Certain non-designated documents listed on the face of the Lightspeed OnSite Claim Chart Contentions listed by Bates numbering: LIGHTSPEED043061.

Certain non-designated documents listed on the face of the Lightspeed OnSite Claim Chart Contentions listed by Bates numbering: LIGHTSPEED043066.

Certain non-designated documents listed on the face of the Lightspeed OnSite Claim Chart Contentions listed by Bates numbering: LIGHTSPEED043071.

Certain non-designated documents listed on the face of the Lightspeed OnSite Claim Chart Contentions listed by Bates numbering: LIGHTSPEED043076.

Certain non-designated documents listed on the face of the Lightspeed OnSite Claim Chart Contentions listed by Bates numbering: LIGHTSPEED043082.

Certain non-designated documents listed on the face of the Lightspeed OnSite Claim Chart Contentions listed by Bates numbering: LIGHTSPEED043088.

Certain non-designated documents listed on the face of the Lightspeed OnSite Claim Chart Contentions listed by Bates numbering: LIGHTSPEED043094.

Certain non-designated documents listed on the face of the Lightspeed OnSite Claim Chart Contentions listed by Bates numbering: LIGHTSPEED043100.

Certain non-designated documents listed on the face of the Lightspeed OnSite Claim Chart Contentions listed by Bates numbering: LIGHTSPEED043106.

Certain non-designated documents listed on the face of the Lightspeed OnSite Claim Chart Contentions listed by Bates numbering: LIGHTSPEED043112.

Certain non-designated documents listed on the face of the Lightspeed OnSite Claim Chart Contentions listed by Bates numbering: LIGHTSPEED043118.

Certain non-designated documents listed on the face of the Lightspeed OnSite Claim Chart Contentions listed by Bates numbering: LIGHTSPEED043124.

Certain non-designated documents listed on the face of the Lightspeed OnSite Claim Chart Contentions listed by Bates numbering: LIGHTSPEED043130.

Certain non-designated documents listed on the face of the Lightspeed OnSite Claim Chart Contentions listed by Bates numbering: LIGHTSPEED043136.

Certain non-designated documents listed on the face of the Lightspeed OnSite Claim Chart Contentions listed by Bates numbering: LIGHTSPEED043142.

(56) References Cited

OTHER PUBLICATIONS

Certain non-designated documents listed on the face of the Lightspeed OnSite Claim Chart Contentions listed by Bates numbering: LIGHTSPEED043154.
Certain non-designated documents listed on the face of the Lightspeed OnSite Claim Chart Contentions listed by Bates numbering: LIGHTSPEED043166.
Certain non-designated documents listed on the face of the Lightspeed OnSite Claim Chart Contentions listed by Bates numbering: LIGHTSPEED043178.
Certain non-designated documents listed on the face of the Lightspeed OnSite Claim Chart Contentions listed by Bates numbering: LIGHTSPEED043190.
Certain non-designated documents listed on the face of the Lightspeed OnSite Claim Chart Contentions listed by Bates numbering: LIGHTSPEED043202.
Certain non-designated documents listed on the face of the Lightspeed OnSite Claim Chart Contentions listed by Bates numbering: LIGHTSPEED043213.

\* cited by examiner

| Qty | Description | Amount | | | | | |
|---|---|---|---|---|---|---|---|
| | | | PRETZELS | DRINKS | | | |
| | | | 11 | 12 | | | |
| | | 13 | Caramel Crunch Pretzel | Cinnamon Sugar Pretzel | Garlic | Original Pretzel | Parmesan Pretzel |
| | | 13 | Pretzel Dog | Sour Cream & Onion Pretzel | Pretzel Sticks | Caramel | Cheddar Cheese |
| | Total | | Honey Mustard | Nacho Cheese | Pizza Sauce | | |
| UP | | DOWN 14 | | | | | |
| 7 | 8 | 9 | QTY | SOLD ITEM | COIN SALE | OPEN DRAWER | |
| 4 | 5 | 6 | ENTER | CASH | RETURN LAST RECEIPT | MISC | |
| 1 | 2 | 3 | | | | | |
| CLEAR | 0 | 00 | | FUNCTION | $5 | $10 | $20 | $50 |

*FIG. 1*

| Qty | Description | Amount | | | | | |
|---|---|---|---|---|---|---|---|
| | garlic | 2.29 | HOME | DRINKS | SMALL | MEDIUM | LARGE |
| | pizza sauce | 0.59 | | | | | |
| | cranberry grape | 1.49 | | | | | |
| | large sprite | 1.50 | COKE | DIET COKE | PUNCH | | SPRITE |
| | | | | | | | |
| | | | | | | | |
| | | | APPLE JUICE | CRANBERRY APPLE RASPBERRY | CRANBERRY GRAPE | DANNON SPRING WATER | MINUTE MAID ORANGE JUICE |
| | | | | | | | |
| | | | COLUMBIAN | | VANILLA | NUT | MACADAMIA NUT |
| | Total | | | | | | |
| UP | | DOWN | | | | | |
| 7 | 8 | 9 | QTY | | | | |
| 4 | 5 | 6 | ENTER | | CASH | RETURN LAST RECEIPT | MISC |
| 1 | 2 | 3 | | FUNCTION | $5 | $10 | $20 | $50 |
| CLEAR | 0 | 00 | | | | | |

FIG. 2

| Screen 1 | Screen 2 | Screen 3 | Screen 4 |
|---|---|---|---|
| 21 | SUBS | | |
| Add Item 20 | Add Item | Add Item | Add Item |
| | | | |
| | | | |

FIG. 4a

Screen 1

| PIZZA | | | |
|---|---|---|---|
| LARGE PIZZA (22) | | | |
| | | | |
| | | | |

ITEM NAME _____
PRICE _____
COST _____
GROUP _____
TAXABLE _____
INVENTORY _____
} 23

FIG. 4b

WEB-BASED POINT OF SALE BUILDER

This is a continuation of U.S. patent application Ser. No. 15/827,948, filed on Nov. 30, 2017, which is a continuation of U.S. patent application Ser. No. 15/635,097, filed on Jun. 27, 2017 and issued as U.S. Pat. No. 10,083,012, which is a continuation of U.S. patent application Ser. No. 15/198,117, filed on Jun. 30, 2016 and issued as U.S. Pat. No. 9,715,371, which is a continuation of U.S. patent application Ser. No. 12/012,666, filed on Feb. 5, 2008 and issued as U.S. Pat. No. 9,400,640, each of which are herein incorporated by reference in their entirety.

RELATED PATENT APPLICATIONS

This application is related to, filed on Feb. 26, 2007, Ser. No. 11,710,722 and, filed on Feb. 26, 2007, Ser. No. 11,710,723, which are herein incorporated by reference in its entirety.

BACKGROUND OF THE INVENTION

Field of the Invention

This invention relates to a system and a method for building a point of sale (POS) system to manage business operations. The business operations range from a single branch to a large chain of stores or branches.

More particularly this invention relates to an online, web-based point of sale builder method, which can assist non-expert business operators in assembling a point of sale system to manage their businesses.

Description of Related Art

Current practice in the field of assembling point of sale systems includes manually coding front-of-screen information. Typically, this front-of-screen information contains menu selections, page selections, and general answers to business questions. This front-of-screen menu is typically manually coded by a business expert with the help of a programmer or data expert. Also, currently the entry of this front-of-screen information requires intimate knowledge of a complex interface to a front-of-screen programming language. In summary, current practice includes the manual building of a point of sale (POS) screen. This manual process requires defining the position and operation of touch screen keys and their database correspondence. Currently, only specially trained people can build or change POS screens. This manual POS building and editing is prone to mistakes and is time-consuming. Since POS screen changes are difficult and prone to error, store owners tend to retain older, inaccurate, out-of-date POS screens in order to avoid the POS screen editing process. Also, current POS screen editing occurs off-line with the testing of the screens occurring at a later date, at a remote store location. The following references represent prior art in the field of screen configuration building.

U.S. Pat. No. 5,818,428 (Eisenbrandt et al.) describes a control system with a user configurable interface, particularly suitable for use in connection with appliances. Users can configure display screens either at a point of sale location or at home with a personal computer.

U.S. Pat. No. 6,629,080 B1 (Kolls) describes a universal advertising and payment system and method for networking, monitoring and advancing electronic commerce and controlling vending equipment.

U.S. Pat. No. 7,051,091B1 (Cohen et al.) discloses a configuration builder useful in configuring software containing hardware units which are serviced by a center which services a multiplicity of similar units having a plurality of different configurations.

U.S. Pat. No. 5,987,426 (Goodwin) describes a system and method of transferring information between a first software application and a second software application which employ an isolation layer. The system includes a client computer system provided by a first seller of computer systems, including a client software application, and a server computer system provided by a second seller of computer system.

BRIEF SUMMARY OF THE INVENTION

It is the objective of this invention to provide a system and a method for building a point of sale (POS) system to manage business operations. The business operations range from a single branch to a large chain of stores or branches.

It is further an object of this invention to provide an online, web-based point of sale builder system and method, which can assist non-expert or expert business operators in assembling a point of sale system to manage their businesses. This point of sale building operation can be done in real time from anywhere in the world.

The objects of this invention are achieved by a web-based point of sale (POS) builder comprising one or more point of sale terminals, which display POS, screens, an Internet connection to a web server, one or more local or remote PC workstations, and point of sale builder software which runs on said web server. Local or remote workstations can be utilized to build or edit said POS terminals in real time, from anywhere in the world and over the world-wide web.

BRIEF DESCRIPTION OF THE DRAWINGS

FIG. 1 shows a typical point of sale touch screen for a pretzel store, as an example only.

FIG. 2 shows a typical touch screen for the drinks panel of a pizza restaurant, as an example only.

FIG. 4a is a sample screen builder panel before the screen building process begins.

FIG. 4b is a sample screen builder panel after the screen building process is under way.

DETAILED DESCRIPTION OF THE INVENTION

Figure 3:
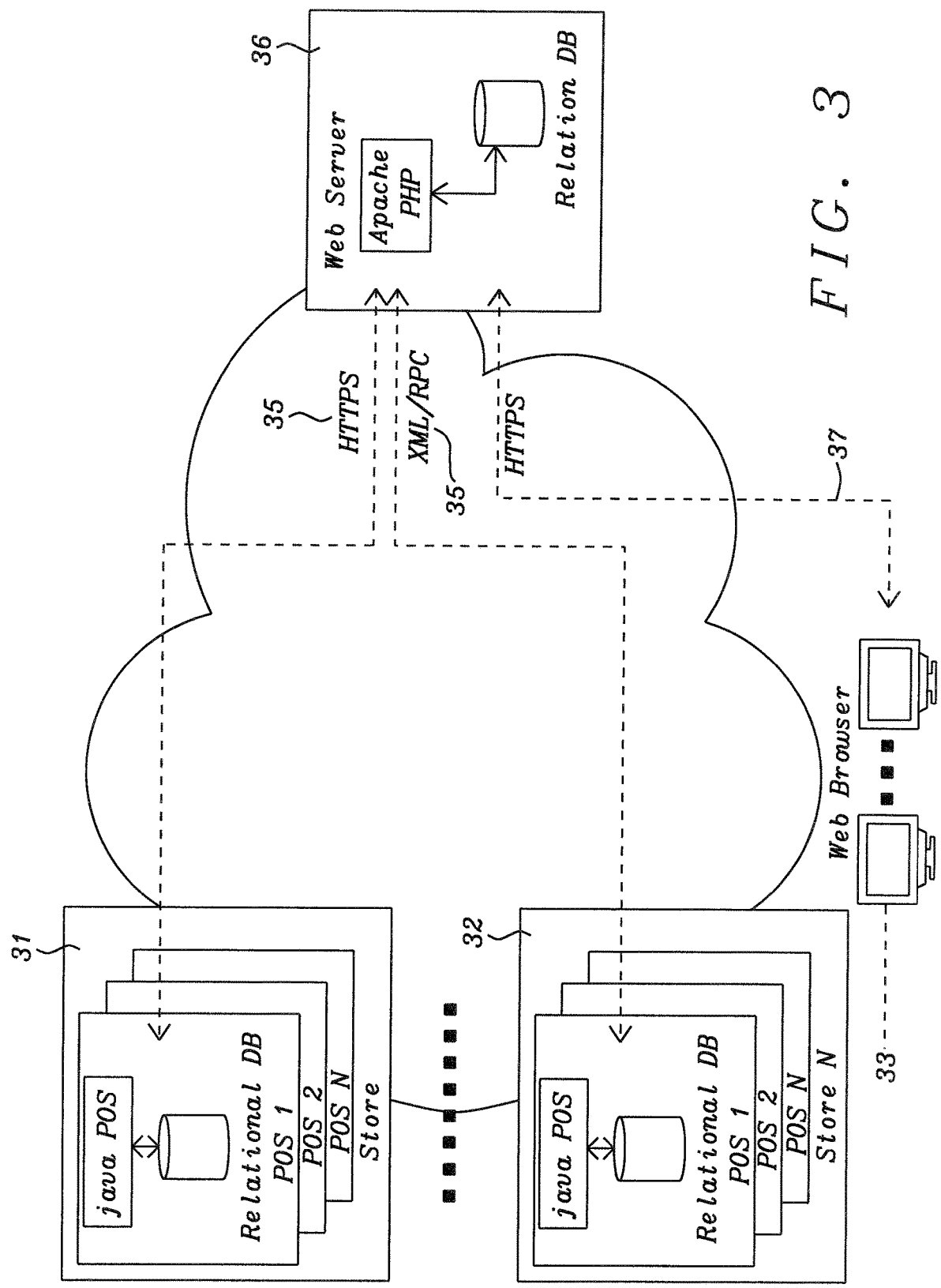
FIG. 3 is a system diagram for web-based back office which supports point of sale terminals.

FIG. 1 shows a typical point of sale (POS) touch screen for, as an example only, a pretzel store. There are touch keys for pretzels 11 and for drinks 12. Selecting these keys would typically bring up secondary screens displaying specific product keys for ordering different types of pretzels and drinks respectively. In addition, the screen in FIG. 1 has some specific pretzel product keys 13 and specific pretzel topping keys 14. Currently in the prior art, a touch screen as shown in FIG. 1 is manually configured by a programmer who knows the specific proprietary point of sale system used by a store or business. The FIG. 1 screen design involves the specific key layout and size of keys. In addition, the FIG. 1 screen keys must have corresponding hooks or references to product data such as item name, price, cost, group, taxable, and inventory as shown in FIG. 4. In this invention, this product data and the touch key structure is stored in relational databases in the back office which is stored on the web servers 36 shown in FIG. 3.

As an example only, FIG. 2 shows a touch screen for the drinks page of a pizza restaurant. Again in the prior art, a specialized programmer had to design the layout and data for these POS touch keys. Typically, the programmer is located remotely from the store or business. He or she must learn about the store's POS requirements via phone calls, emails, and meetings with store operators. In addition, the programmer would need to iterate several passes of the touch screen design and allow the store operator to test the screens. With this invention, the store operator will be able to build his POS screens online over the Internet. With input from the store operator, the POS builder can specify and display the number, shape and arrangement of selection keys or buttons on said POS screens. The store operator, who does not have to be technically trained, will be able to edit and test his screens until he is satisfied with the end results. The testing of said POS screens can be done iteratively by the store operator in real time while said POS terminals are simultaneously in use during store and business operation hours or after store hours. Alternatively, the testing of said POS screens can be done iteratively by a remotely located person such as a store manager or director in real time while said POS terminals are simultaneously in use during store hours or after store hours. All backoffice changes which include screen changes, price changes, employee validation changes are submitted to a batch bucket or queue. These changes have to be submitted for final posting at a scheduled time. For example, the phasing in of new screens and/or new data such as prices and employee validation can be scheduled. The time schedule for uploading or posting these screen changes and/or new data can be specified as follows. Only as examples, the changes can take place after the present transactions are completed. Alternatively, the changes can take place at the end of the business day, during the night, at the start of the next day or at the next application restart for example. Typically, screen changes will take place at the next application start at the beginning of a business day.

This automatic online POS builder will reduce the development time for POS screens by weeks. In addition, the store operator will be able to edit the POS screens and its relational databases any time as often as desired. In addition, the store operator will be able to edit, change and test the screens within minutes in real time. The store operator can iterate these changes instantly until he gets the desired screen appearance. This real-time testing and iteration of screen designs is an important feature of this invention. This feature motivates the store operator to keep his screens up to date and accurate. Previously, the store operator would avoid updating screens, since it involved the time and expense of working with programmers off line.

FIG. 3 shows a high level diagram of this invention. There are N POS terminals (POS 1, POS 2 . . . POS N) in "Store" 31 and in "Store N" 32. POS 31 is in Store 1 and POS 2 (32) is in Store 2. Each POS includes personal computer hardware and software. Additional POS terminals beyond those shown, as well as additional stores beyond the two shown, are within the scope of the invention. Each POS normally operates with a hardware/software connection 35 to the Internet or Web. However, if the web goes down, the POS terminal continues to operate. There is a "loose coupling" of the POS to the back office (BO): the POS to BO connection is not required for the basic business functions of the POS. All transaction data is stored in a relational database on the hard drive in the POS.

A relational database stores all of its data inside tables. All operations on data are done on the tables themselves. Some operation produce other tables as the result. A table is a set of rows and columns. Each row is a set of columns with only one value for each. All rows from the same table have the same set of columns, although some columns may have NULL values. A NULL value is an "unknown" value. The rows from a relational table are analogous to a record, and the columns are analogous to a field. Below is an example of a relational table.

| NAME | COMPANY | E_MAIL |
| --- | --- | --- |
| Jane A. Doe | ABC | jad@abc.com |
| Bill X. Smith | XYZ | bxs@xyz.com |

There are two basic operations one can perform on a relational table. The first one is retrieving a subset of its columns. The second is retrieving a subset of its rows. The field names such as company describe the content of the columns of the relational table. The rows delineate the individual records stored in the relational tables.

As transactions are created at a POS a log entry for the newest transaction is also created, this log entry is used to flag if the transaction has been uploaded to the web server. Part of the POS application, the BO interface is continuously running in the background. This component reads the log of transactions. If a transaction needs to be sent, it tries to send it. If the send fails (for example, if the connection to, or the Internet itself, is down), it goes to sleep and tries again later. Additionally, the BO interface requests update from the BO such as new items, price changes, employees, etc. The POS terminals communicate via HTTP protocol (hypertext transfer protocol) 35 with Back-office BO software, which is implemented on web servers 36, which can be located anywhere in the world. In addition, the BO software and data can be viewed from any store employee at any PC 33 who has Internet access 37 and a password.

The POS such as 31 send transaction data to the 80 in the form of an HTTP post or communication. The packet 35 sent from the POS to the BO consists of transactions, employee clock, customer add/update, item add/update, promotions and more. Promotions are configured in the back office and associated with items or customers or departments. For example, a promotion may be associated with a customer to implement customer loyalty points or a promotion may be associated with a certain item for a % discount. A client who is the store manager or owner selects a promotion type, associates it with an item, department, etc, then sets the parameters that control how that promotion works. These transaction transmissions between the POS and the BO can be encrypted to insure privacy and security. A typical encryption method is 128 bit SSL (secure sockets layer). A further element of security is that each BO client (individual POS, store or multi-store owner) gets their own instance of a database. When they log into the BO they are attached to their own relational database associated and validated via their user login and password.

FIGS. 4a and 4b show a typical web-based POS builder interface. FIG. 4a shows a grid of boxes labeled with screen numbers 1-4. Typically, screens will have screen names such as in 21, "Subs". Under each screen box column are boxes labeled "Add Item". These boxes allow the addition of different products such as small pizza, large pizza, etc. as shown in FIG. 4b. FIG. 4b shows the data interface which would appear when selecting the large pizza box. The store operator would be able to enter and/or modify item name, price, cost, group, taxable and inventory. The above illustrates the ease of building POS screens by store operators via the Web.

Figure 5:
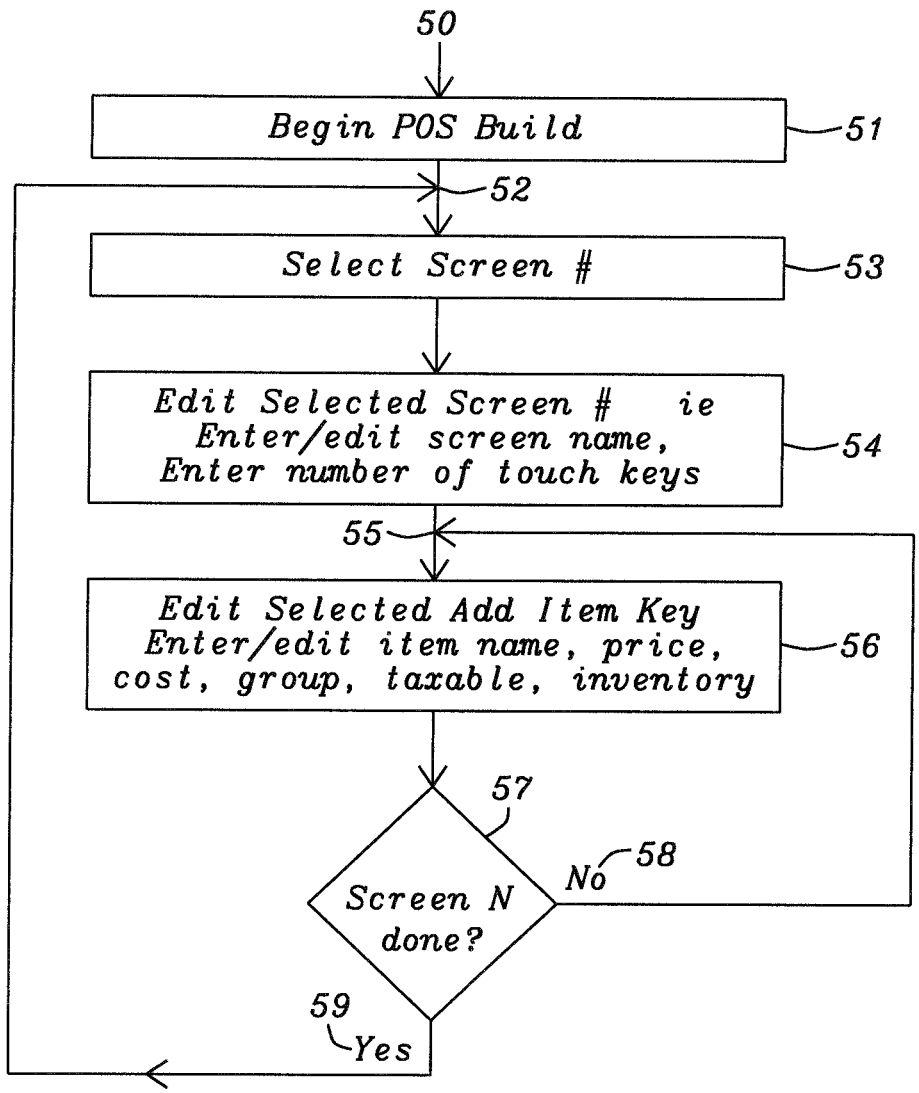
FIG. 5 is a high level flowchart which illustrates the main embodiment of the screen building process.

FIG. 5 shows a flowchart of the point of sale builder methodology. The flow in FIG. 5 also refers to FIGS. 4a and 4b. The Begin POS Build block 51 is entered when the Builder Program is initiated 50 from a Web page action.

When creating a new POS, Block 51 brings up a screen such as that shown in FIG. 4a. The screens in FIG. 4a need to be defined. Block 53 allows the store operator to select which screen number to define. FIG. 4b shows what appears on the Web screen after the store operator selects screen #1 (53) to work on. In FIG. 5, Block 54 allows the store operator to enter/edit the screen name being worked on, such as pizza, as an example only, in FIG. 4b. In FIG. 5, block 54 allows the store operator to enter the number of touch keys planned for the pizza screen, as an example only.

FIG. 4b shows the screen after a few touch screen buttons have been defined. Screen 1 has been labeled Pizza. The pizza screen in FIG. 4b currently has 1 touch screen button item defined on the screen, Large pizza 22. The Large Pizza item button was entered by hitting ADD Item 20 in FIG. 4a. After hitting add item, FIG. 4b appears with the template 23 to be filled in. This step is shown in block 56 of FIG. 5. The template includes Item Name, Price, Cost, Group, Taxable, Inventory. Item Name is Large Pizza. Price is easily changeable, Cost is the cost of making materials. Group is the Pizza Group, Taxable is as yes or no selection. Inventory can be used to monitor the number of Large Pizza's makeable with the dough, cheese and sauce on hand. Other Template items can be added to the template 23 in FIG. 4b.

In FIG. 5, block 57 asks whether the screen being worked on i.e.) Pizza Screen is done. If the store operator answers yes 59, the flowchart flows to Node 52 in FIG. 5. This allows the store operator to select another screen # as shown in FIG. 4a. If the store operator answers no 58, the flowchart flows to Node 55 in FIG. 5. This allows the store operator to select, add, or edit another item on the pizza screen.

The key advantages of the Web-based POS builder are that it is completely built on the foundation of the Web. The POS builder is accessible anywhere in the world. It can be used by a person of any skill level. The POS builder builds, edits, and tests new POS terminals in real time. In addition, all screen designs and changes are reflected real-time into the back office (BO) server's screen database. For example, all screen designs inputted from any PC in the world appear instantly in the BO screen database, which is instantly viewable anywhere in the world via web browsers. Another big advantage is that all screen design software is located and executed in the BO server. Since all screen designs and changes are immediately visible from any manager's PC at their home or at headquarters, there is always management oversight of these changes. Therefore, this screen builder allows for local in-store flexibility by the individual store operator or manager, but also provides for corporate visibility of screens instantly for control and standardization. Also, this screen builder does not require the need for any server to be located in the store. Another advantage of this system is the use of standard PC and web architecture which offers both full-scalability without degrading system performance. This results in improved performance and lower cost of implementing these business systems. There is a lower cost associated with projects developed with the technology of this invention due to the flexibility of easy design changes and well-understood software. There is less training required for programmers and system testers. Projects can draw on the huge talent pool in the open source development community. The invention allows configurable software modules for different types of businesses and sales promotions. The invention allows remote monitoring of screen designs from anywhere via the web. There is minimal time required for the implementation and installation of the POS builder system, since the POS builder setup is as basic as a home PC setup. Another advantage is that the POS builder system can be provided as a service or deployed within a corporation. For example, Software as a Service (SAAS) is a software distribution model in which applications are hosted by a vendor or service provider and made available to customers over a network, typically the Internet. Another advantage of this invention is that the POS builder system is maintained in customer centric databases, making it impossible for customers to see other's data. Each POS builder system client gets their own instance of a database. When they log into the BO they are attached to their own relational database associated and validated via their user login and password.

While this invention has been particularly shown and described with Reference to the preferred embodiments thereof, it will be understood by those Skilled in the art that various changes in form and details may be made without Departing from the spirit and scope of this invention.

What is claimed is:

1. A web-based point of sale (POS) builder system comprising:
    at least one server configured to:
        communicate remotely with one or more computing devices over a network, the network comprising the Internet, to provide said one or more computing devices with access to POS builder software on said at least one server for creating or modifying one or more POS terminal functions for supporting one or more POS transactions associated with one or more items; and
        communicate remotely with one or more POS devices over the network to configure at least some of the POS devices with the POS terminal functions for supporting the one or more POS transactions, said POS transactions by corresponding customers respectively associated with at least one of said one or more POS devices,
        wherein each POS device is configured to store transaction information corresponding to the one or POS transactions respectively carried out thereat, builder information used for creating or modifying the one or more POS terminal functions, or a combination thereof, whereby such transaction information and builder information is accessible to the corresponding POS device without access to the network or the at least one server, and
        wherein the transaction information regarding the one or more POS transactions, the builder information used for creating or modifying the one or more POS terminal functions, or a combination thereof comprises one or more of item information, employee clock information, customer add/update information, item add/update information, promotion information, loyalty point information, discount information, taxation information, item cost information, or inventory information.

2. The web-based point of sale (POS) builder system of claim 1, wherein the POS terminal functions include POS builder information for modifying or creating POS display interfaces.

3. The web-based point of sale (POS) builder system of claim 2, wherein the one or more POS devices comprise a plurality of POS devices.

4. The web-based point of sale (POS) builder system of claim 3, wherein the plurality of POS devices are located in multiple stores.

5. The web-based point of sale (POS) builder system of claim 1, wherein the at least one server is further configured to receive, from the one or more POS devices, one or more videos captured by one or more cameras, wherein the one or more videos are correlated with the one or more POS transactions.

6. The web-based point of sale (POS) builder system of claim 1, wherein the POS devices are in direct network communication to the one or more servers.

7. The web-based point of sale (POS) builder system of claim 6, wherein the information regarding one or more POS transactions are viewable via a POS builder interface.

8. The web-based point of sale (POS) builder system of claim 2, wherein one or more POS display interfaces comprise one or more buttons or keys.

9. The web-based point of sale (POS) builder system of claim 2, wherein POS builder information comprises at least one of a number, shape, or arrangement of one or more POS display interfaces.

10. The web-based point of sale (POS) builder system of claim 1, wherein a POS builder interface is accessible via a web browser.

11. The web-based point of sale (POS) builder system of claim 2, wherein one or more POS display interfaces are accessible on a POS builder interface.

12. The web-based point of sale (POS) builder system of claim 2, wherein the at least one server is further configured to:
receive, over the network from a POS builder interface, second information regarding a modification to at least one of the POS display interfaces; and
update the at least one of the POS display interfaces on the one or more POS devices based on the second information.

13. The web-based point of sale (POS) builder system of claim 1, wherein the at least one server is further configured to store information regarding the one or more POS devices.

14. The web-based point of sale (POS) builder system of claim 2, wherein the at least one server is further configured to receive the builder information for creating or modifying one or more POS display interfaces and create or modify the one or more POS display interfaces in real time while the one or more POS devices are in use in association with one or more POS transactions.

15. The web-based point of sale (POS) builder system of claim 2, wherein the one or more POS devices use the POS display interfaces after completing a pending POS transaction.

16. The web-based point of sale (POS) builder system of claim 2, wherein the at least one server is further configured to maintain information regarding POS display interfaces for separate sets of POS devices separately.

17. The web-based point of sale (POS) builder system of claim 1, wherein instructions to a POS builder interface for programmatic creation and modification of the POS devices are not formatted in programming code.

18. The web-based point of sale (POS) builder system of claim 1, wherein the at least one server is configured to receive information comprising attributes of the one or more POS transactions or the items associated therewith.

19. The web-based point of sale (POS) builder system of claim 1, wherein the POS devices are configured to perform transactions independently of a connection with the network.

20. The web-based point of sale (POS) builder system of claim 1, wherein one or more of the POS devices and the computing devices are implemented using personal computer (PC) architecture.

21. A method of implementing a web-based point of sale (POS) builder system, the method comprising:
communicating from one or more servers, with one or more computing devices over a network, the network comprising the Internet, to provide said one or more computing devices with access to access to POS builder software on at least one server for creating or modifying one or more POS terminal functions for supporting one or more POS transactions associated with one or more items;
receiving by said one or more servers, over the network information for creating or modifying the one or more POS terminal functions on one or more POS devices; and
communicating remotely, from said one or more servers, with the one or more POS devices over the network to configure at least some of the POS devices with the POS terminal functions for supporting the one or more POS transactions, said POS transactions by corresponding customers respectively associated with at least one of said one or more POS devices,
wherein each POS device is configured to store transaction information corresponding to the one or POS transactions respectively carried out thereat, builder information used for creating or modifying the one or more POS terminal functions, or a combination thereof, whereby such transaction information and builder information is accessible to the corresponding POS device without access to the network or the at least one server, and
wherein the transaction information regarding the one or more POS transactions, the builder information used for creating or modifying the one or more POS terminal functions, or a combination thereof comprises one or more of item information, employee clock information, customer add/update information, item add/update information, promotion information, loyalty point information, discount information, taxation information, item cost information, or inventory information.

22. The method of claim 21, wherein the POS terminal functions include POS builder information for creating or modifying one or more POS display interfaces.

23. The method of claim 21, wherein instructions to a POS builder interface for programmatic creation and modification of the POS devices are not formatted in programming code.

24. The method of claim 21, further comprising receiving information comprising attributes of the one or more POS transactions or the items associated therewith.

25. The method of claim 21, wherein the POS devices are configured to perform transactions independently of a connection with the network.

26. The method of claim 21, wherein the one or more POS devices comprise a plurality of POS devices.

27. The method of claim 26, wherein the plurality of POS devices are located in multiple locations.

28. The web-based point of sale (POS) builder system of claim 1, wherein the at least one server is further configured to receive, from one or more cameras placed at corresponding POS devices, videos captured by the one or more cameras, wherein the videos are correlated with the one or more POS transactions occurring at the corresponding POS devices.

29. The web-based point of sale (POS) builder system of claim 28, wherein the videos are correlated with the one or more POS transactions by being indexed by the same POS clock.

30. The method of claim 21, further comprising receiving, from one or more cameras placed corresponding POS devices, one or more videos captured by the one or more cameras, wherein the one or more videos are correlated with the one or more POS transactions occurring at the corresponding POS devices.

31. The method of claim 30, wherein the videos are correlated with the one or more POS transactions by being indexed by the same POS clock.

\* \* \* \* \*